United States Patent [19]
Richmond

[11] Patent Number: 5,269,333
[45] Date of Patent: Dec. 14, 1993

[54] ANTI-CLOG WATER VALVE

[75] Inventor: James W. Richmond, Carmel, Ind.

[73] Assignee: Emerson Electric Co., St. Louis, Mo.

[21] Appl. No.: 52,008

[22] Filed: Apr. 22, 1993

[51] Int. Cl.[5] .................. F16K 31/04; F16K 31/40; F16K 31/385

[52] U.S. Cl. .................. 137/1; 251/30.03; 251/30.05; 251/38; 251/45; 251/120

[58] Field of Search ............. 138/45, 46; 251/30.02, 251/30.03, 30.04, 30.05, 38, 45, 46, 118, 120; 137/1, 2

[56] References Cited

U.S. PATENT DOCUMENTS

| | | | |
|---|---|---|---|
| Re. 29,863 | 12/1978 | Kozel et al. | 137/242 |
| 3,593,956 | 7/1971 | McCarty, Jr. | 251/30.03 |
| 3,593,957 | 7/1971 | Polter et al. | 251/30 |
| 3,672,627 | 6/1972 | McCarty, Jr. et al. | 251/30 |
| 3,872,878 | 3/1975 | Kozel et al. | 137/242 |
| 4,174,824 | 11/1979 | Kolze | 251/30.03 |
| 4,178,573 | 12/1979 | Swanson | 251/30.03 |
| 4,179,096 | 12/1979 | Fromfield | 251/38 |
| 4,387,878 | 6/1983 | Zukausky | 251/30.03 |
| 4,453,563 | 6/1984 | Walters | 137/414 |
| 4,500,067 | 2/1985 | Zukausky | 251/38 |
| 4,844,112 | 6/1989 | Pick et al. | 137/15 |
| 4,860,990 | 8/1989 | Fukuzawa et al. | 251/30.03 |
| 5,082,240 | 1/1992 | Richmond | 251/120 |
| 5,090,441 | 2/1992 | Richmond | 137/242 |
| 5,125,621 | 6/1992 | Parsons et al. | 251/30.03 |
| 5,145,145 | 9/1992 | Pick et al. | 251/30.03 |
| 5,154,394 | 10/1993 | DuHack | 251/120 |

Primary Examiner—George L. Walton
Attorney, Agent, or Firm—Robert F. Meyer; Eric R. Waldkoetter

[57] ABSTRACT

A household appliance, solenoid controlled, pilot actuated inlet water valve has a diaphragm insert with a bleed valve that substantially closes when a main valve is open to reduce water and contaminate flow through the bleed passage. The pilot valve outlet extension has openings to reduce vacuum drawn from the outlet into an actuation chamber thereby further reducing water flow through the bleed passage. The bleed passage is internally and externally configured to reduce contamination impairment. An anti-hammer rib or lip is placed on the pilot valve outlet extension upstream of a guide tip which provides less close-fitting surface that may be impaired by contaminates while still dampening valve closing to reduce valve noise and pipe hammer.

21 Claims, 15 Drawing Sheets

ANTI-CLOG WATER VALVE

BACKGROUND

This invention relates to solenoid controlled, pilot operated inlet water valves and more specifically to water valves used in household appliances such as dishwashers and clothes washing machines.

Contamination, especially in the form of particulate matter, can impair the operation or clog water valves. Contamination can take many forms including sand particles, mineral particles, organic particles, mineral deposits, or other impurities. The basic structure of a pilot actuated water provides many opportunities for contamination to impair valve operation. There are small passages through which water must pass such as an inlet screen, bleed passage and a pilot passage. There are also close fitting parts that must move or seal such as the fitting between the pilot valve outlet extension and the outlet and the seal between the diaphragm and valving surface.

A water valve impairment can also take many forms including the following: a complete bleed passage obstruction causing catastrophic valve failure; a partial bleed passage obstruction slowing valve closing thereby wasting water; an obstruction between the outlet and the pilot valve outlet extension causing valve failure; a partial obstruction between the outlet and the pilot valve outlet extension causing slowed or incomplete valve closing; an obstruction between a guide tube and armature that causes valve failure; or a partial obstruction between the guide tube and armature that interferes with pilot valve operation.

An impaired water valve often increases water consumption through incomplete or slow closing. When an inlet water valve used in a household appliance is impaired but still functional, it may be difficult for the appliance operator to recognize the impairment because the water valve will leak to a holding tank or to a drain not be visible to the appliance operator. If the water valve is impaired by closing more slowly than designed, then water levels may be higher than desired or water volume may be greater than desired or the water valve may direct some water directly into an open drain. Unnecessary water consumption is not desirable, particularly when the water wasted is hot water. Wasting of even small amounts of hot water increases energy consumption.

In prior art appliance inlet water valves 20P, such as shown in FIG. 1, a bleed passage 28P is provided in a main valve 24P to allow pressure equalization between a main chamber 60P and an actuation chamber 58P. The bleed passage 28P is when the main valve 24P is both open and closed. Since the bleed passage 28P is typically small, it is one of the most vulnerable valve structures to clogging. Additionally if contamination passes through the bleed passage 28P into the actuation chamber 58P, an armature 76P that slides in a guide tube 48P to operate the pilot valve 26P can become jammed causing main valve 24P failure.

Pressure equalization between the main chamber 60P and actuation chamber 58P is necessary in pilot actuated valves to provide assistance in closing the main valve 24P. Once the main valve 24P is open, pressure equalization is generally not required until the armature 76P opens the pilot valve 26P and pressure equalization is needed to close the main valve 24P. During the time the main valve 24P is open, the greatest pressure differential between the main chamber 60P and the actuation chamber 58P exists, so there is also the greatest flow rate through the bleed passage 28P. The pressure differential is caused by the outlet 38P vacuum being pulled into the actuation chamber 58P through the pilot valve outlet extension 82P.

Previous appliance water valves have decreased bleed passage clogging and armature jamming from contaminates with a lever operated bleed valve to decrease water flow through the bleed passage when the main valve is open. A lever operated bleed valve adds additional mechanical components that can fail, increase production costs, and can create a greater number valves that fail to meet quality standards. An example of a lever operated bleed valve is disclosed in U.S. Pat. No. 5,090,441 issued to Richmond.

Previous appliance water valves have also decreased bleed passage clogging and armature jamming from contaminates with a fine mesh inlet screen. A fine inlet screen is capable of preventing some contamination from entering the water valve, but the inlet screen itself can become clogged causing valve failure. Of course an inlet screen would not appreciably decrease water flow through the bleed passage, so contamination that could pass through the inlet screen could still become clogged in the bleed passage or enter into the actuation chamber and hinder valve operation.

Previous appliance water valves have decreased bleed passage clogging and armature jamming from contaminates by reducing the vacuum drawn from the outlet through the pilot valve outlet extension into the actuation chamber when the main valve is open. By reducing vacuum drawn into the actuation chamber, water flow through the bleed passage is reduced. Vacuum reduction is achieved by shortening the pilot valve outlet extension and reducing or eliminating its function of guiding the main valve onto a valving surface. Elimination of pilot valve outlet extension's guiding function can cause the main valve to seat in different positions on the valving surface. Since the main valve seat develops a seating groove, failure to seat in this groove can cause an incomplete seal. An example of a shortened pilot valve outlet extension is disclosed in U.S. Pat. No. 3,872,878 issued to Kozel et al.

Previous appliance water valves have also decreased bleed passage clogging and armature jamming from contaminates by gradually widening the bleed passage in the direction of water flow from the main chamber to the actuation chamber, so contamination that enters the bleed passage is less likely to be retained in the bleed passage. An example of a gradually widening bleed passage is disclosed in U. S. Pat. No. 4,500,067 issued to Zukausky.

Previous appliance valves have decreased pilot valve outlet extension jamming or sticking in the outlet caused by contaminates by reducing much of the exterior of the pilot valve so only a small portion of the pilot valve exterior adjacent to the downstream end fits closely within the outlet. An example of a pilot valve outlet extension with a reduced exterior is disclosed in U.S. Pat. No. 4,500,067 issued to Zukausky.

For the foregoing reasons, there is a need to reduce water flow and thereby contaminate flow through the bleed passage while the main valve is fully open to reduce the probability of the bleed passage becoming obstructed or the armature sticking or jamming in the guide tube. There is also a need to structure the bleed passage so that contaminates that enter the bleed passage pass through and do not obstruct the bleed passage. There is also a need to structure the bleed passage to decrease the likelihood of contaminates becoming lodged between the bleed passage entrance and the main valve diaphragm. Finally, there is a need to decrease the portion of the pilot valve outlet extension that fits closely in the outlet to decrease contaminate interference with the pilot valve extension while still maintaining the pilot valve extension guide function for proper valve operation.

SUMMARY

I have invented an apparatus and method that satisfies the need for a water valve with a decreased potential for contamination to be deposited in the water valve by reducing water flow through a bleed passage, modifying bleed passage structure to reduce clogging, and modifying pilot valve structure to reduce interference due to contamination in an outlet with the novel features described below.

Reducing water flow through a bleed passage when a main valve is open also reduces contaminate flow into the bleed passage. A reduction in water flow through the bleed passage can be accomplished with a bleed valve having a seat that mates with a guide tube when the main valve is open to substantially close the bleed passage. A reduction in water flow can also be accomplished with a vacuum reduction opening in a pilot valve extension which decreases the pilot valve extension's effective vacuum length. By reducing the pilot valve extension's effective vacuum length, there is a corresponding reduction in the vacuum drawn from the outlet into an actuation chamber when the main valve is partially or fully open which also reduces the pressure differential between the main chamber and the actuation chamber to reduce water flow through the bleed passage. Both a bleed valve and a vacuum reduction opening can be used in conjunction with each other to reduce water flow through the bleed passage.

Bleed passage structure is modified to reduce the potential for contaminates to be deposited with a sharply widening internal bleed passage that sharply widens after a main chamber opening to provide increased space for contaminates that enter the main chamber opening to more readily pass through the main chamber opening. The sharply widening internal passage is used in conjunction with a gradually widening internal passage because there is only a limited amount of force available to close the bleed valve against the guide tube and the force to overcome water pressure relates directly to cross sectional area. Additionally, the bleed passage structure could not accommodate a sharply widening passage for the entire length of the bleed passage.

Bleed passage structure is also modified to reduce the potential for contaminates to be deposited with an extended bleed passage main chamber opening that extends through a diaphragm bleed orifice to prevent contamination from becoming deposited between the diaphragm orifice and the bleed passage main chamber opening.

Pilot valve structure is modified to reduce interference with contamination in an outlet with an anti-hammer rib on a pilot valve outlet extension to decrease the potential for contamination to become deposited between the anti-hammer rib and the outlet while at the same time retaining a guide tip on the downstream end of the pilot valve outlet extension.

A method of reducing the flow of contaminates into a bleed passage in a solenoid controlled, pilot operated appliance water valve is provided by first actuating the water valve to a fully open position and then substantially closing the bleed passage mating a bleed valve with a guide tube to reduce water flow through the bleed passage.

BRIEF DESCRIPTION OF THE DRAWINGS

These and other features, aspects, and advantages of the present invention will become better understood with regard to the following description, appended claims, and accompanying drawings where:

DETAILED DESCRIPTION

Figure 2:
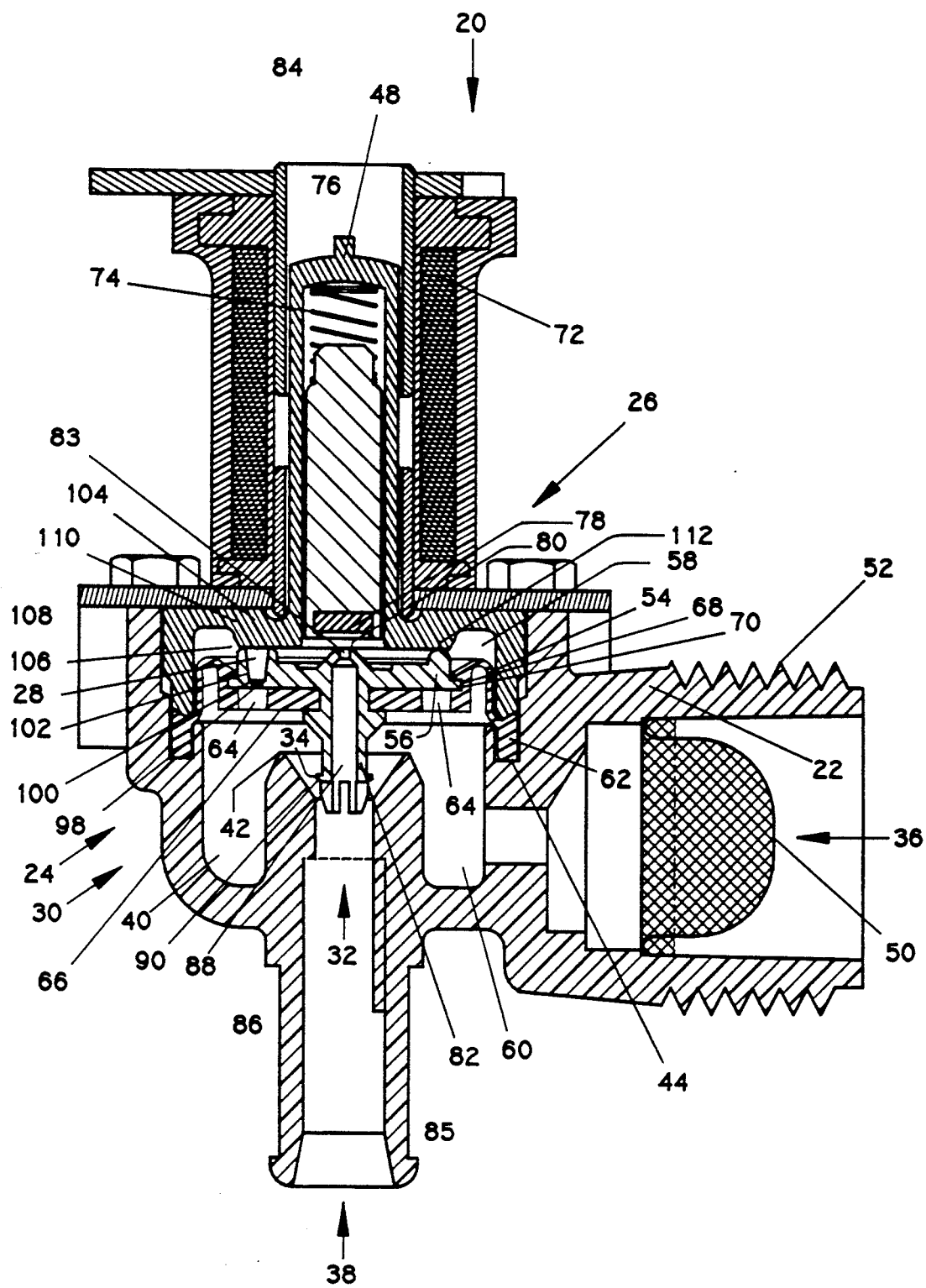
FIG. 2 shows a sectioned view of an anti-clog water valve.

Referring to FIG. 2, an anti-clog water valve 20 comprises: a valve body 22, a main valve 24, a pilot valve 26, a bleed passage 28, a flow reduction means 30, a vacuum reduction opening 32, and an anti-hammer rib 34.

The valve body 22 is typically polypropylene and comprises an inlet 36, and outlet 38, a valving cavity 40, a valving surface 42, a diaphragm retention groove 44, and a guide tube 48 or armature housing. The inlet 36 includes an inlet screen 50 to prevent large particulate contamination from entering the water valve 20. The inlet screen 50 is typically a woven wire cloth, such as that produced by Newark Wire Cloth Co., Newark, N.J., of sixty (60) mesh, i.e., mesh with width of openings ranging from 0.0057 inches (0.015 cm) to 0.0107 inches (0.027 cm) depending on the diameter of the wire used to produce an open area percentage of from 11.7% to 41.2%. Since anti-clog features reduce the likelihood that fine particles will clog the water valve 20, an inlet screen 50 with even larger openings such as a fifty (50) mesh that has width of openings ranging from 0.008 inches (0.020 cm) to 0.0125 inches (0.032 cm) can be employed to reduce the likelihood that the inlet screen 50 will become clogged. A residential water line with service pressures ranging 20–125 pounds per square inch (138-861.9 kPa) is connected to the inlet 36 typically with a threaded garden hose type connector 52 or a threaded pipe connector (not shown) to create flow rates through the water valve 20 of about one (1) to about twenty (20) gallons (3.79-75.71 liters) per minute. The outlet 38 is typically a tube connector to which an appliance fill tube (not shown) is clamped.

The valve body 22 includes a valving cavity 40 disposed between and communicating with the inlet 36 and outlet 38. The valving surface 42 is contained in the valving cavity 40 adjacent to the outlet 38. The valving cavity 40 also contains a retention groove 44 for fixing the main valve 24. The guide tube 48 is designed to cooperate with the retention groove 44 for fixing the main valve 24 in position.

The main valve 24 comprises a diaphragm 54 and a diaphragm insert 56. The main valve 24 divides the valving cavity 40 into an actuation chamber 58 and a main chamber 60. The main valve 24 is moveable to an open position away from the valving surface 42 for permitting water flow from the inlet 36 through the valving cavity 40 to the outlet 38, and moveable to a closed position contacting the valving surface 42 for preventing water flow from the inlet 36 through the valving cavity 40. The diaphragm 54 is flexible and is typically made of ethylene propylene (EP) rubber and includes a retention ridge 62, diaphragm bleed orifice 64, and a diaphragm valve seat 66. The retention ridge 62 fits in a diaphragm retention groove 44 in the valve body 22 and the guide tube 48 sets on the retention ridge 62 to fix the diaphragm 54 in the valve body 22 and to create a seal.

There are two diaphragm bleed orifices 64 in the diaphragm; one of which is aligned with the bleed passage 28 to allow water to pass through the diaphragm 54 into the bleed passage 28. The purpose of the second diaphragm bleed orifice 64 is for ease of main valve 24 assembly so either diaphragm bleed orifice 64 can be lined up with the bleed passage 28. Additional diaphragm bleed orifices 64 may be provided in the diaphragm 54. Diaphragm bleed orifices 64 can provide an area for waterborne contaminates to be deposited and interfere with water flow into the bleed passage 28. The diaphragm valve seat 66 is a flat smooth portion of the diaphragm 54 that contacts the valving surface 42 to form a seal when the main valve 24 closes.

The diaphragm insert 56 comprises retention tabs 68, and carries the pilot valve 26 and bleed passage 28. The main valve 24 diaphragm insert 56 is rigid and is typically made of polypropylene. The diaphragm insert 56 retention tabs 68 fit within a diaphragm groove 70 to fix the diaphragm insert 56 in the diaphragm 54.

The pilot valve 26 includes field windings 72, a biasing spring 74, a solenoid armature 76, a pilot valve seat 78, a pilot valve surface 80, a pilot valve outlet extension 82, and a pilot valve passage 83. The pilot valve seat 78 is attached to the armature 76. The armature 76 is slideably carried in the guide tube 48 and is moveable to an open position away from the pilot valve surface 80 for permitting water flow from the actuation chamber 58 to the outlet 38 and moveable to a closed position contacting the pilot valve surface 80 for preventing water flow from the actuation chamber 58 to the outlet 38. The pilot valve passage 83 is approximately 0.033 inches (0.084 cm) which is larger than the bleed passage 28. The pilot valve outlet extension 82 slideably engages the outlet 38 for providing a water flow channel from the actuation chamber 58 through the pilot valve passage 83 into the outlet 38.

There is a clearance 84 of approximately 0.010-0.026 inch (0.025-0.066 cm) between the armature 76 and the guide tube 48 to permit the armature 76 to axially displace. Clearance variations are caused by tolerance variations and the draft angle of the molded plastic guide tube 48. Since water that passes through the bleed passage 28 into the actuation chamber 58 can enter this clearance 84, contamination carried by water can impede the operation of or jam the armature 76 thereby causing pilot valve 26 partial or total failure.

When the field windings 72 are energized, the armature 76 is retracted to lift the pilot valve seat 78 from the pilot valve surface 80 thereby opening the pilot valve 26 to permit flow of water from the actuation chamber 58 into the outlet 38. When the field windings 72 are deenergized, the armature 76 is extended by the biasing spring 74 and the pilot valve seat 78 contacts the pilot valve surface 80 thereby closing the pilot valve 26 to stop the flow of water from the actuation chamber 58 through the pilot valve 26 and into the outlet 38. The pilot valve outlet extension 82 extends through the diaphragm 54 into the outlet 38.

The pilot valve outlet extension 82 includes an anti-hammer rib 34 on the exterior of the pilot valve outlet extension 82 which functions to slow main valve 24 closing and thereby reduce internal valve noise and pipe hammer cause by a pressure spike generated when a main valve 24 closes too quickly. The anti-hammer rib 34 may also be called an annular rib, ridge, lip, band, or bead. The anti-hammer 34 rib slows main valve 24 closing by restricting the outlet 38 when the anti-hammer rib 34 enters the outlet 38. The anti-hammer rib 34 also slows valve 24 closing by creating turbulence in the water flow into the outlet 38 and by creating a back pressure when engaging the outlet 38. The anti-hammer rib's 34 slowing of main valve 24 closing reduces internal water valve 20 noise and pipe hammer. The anti-hammer rib 34 is a continuous rib and is separated from the downstream end 86 of the pilot valve outlet extension 82 by a guide tip 85. The guide tip 85 has a downstream end 86 that is tapered to guide the pilot valve outlet extension 82 into the outlet 38 when the main valve 24 moves from an opened position to a closed position.

The anti-hammer rib 34 is adjacent to a vacuum reduction opening 88 that extends from the anti-hammer rib 34 to the downstream end 86 of the pilot valve outlet extension 82. Although the anti-hammer rib 34 can vary in width, the anti-hammer rib 34 is preferably no wider than about 0.025 inches (0.0635 centimeters) to reduce the likelihood that contamination can come between the anti-hammer rib 34 and the outlet 38 to interfere with water valve 20 operation. A portion of the anti-hammer rib 34 downstream edge 90 is chamfered to about a 30° angle for ease of downstream movement in the outlet 38, and to increase structural strength.

Figure 5:
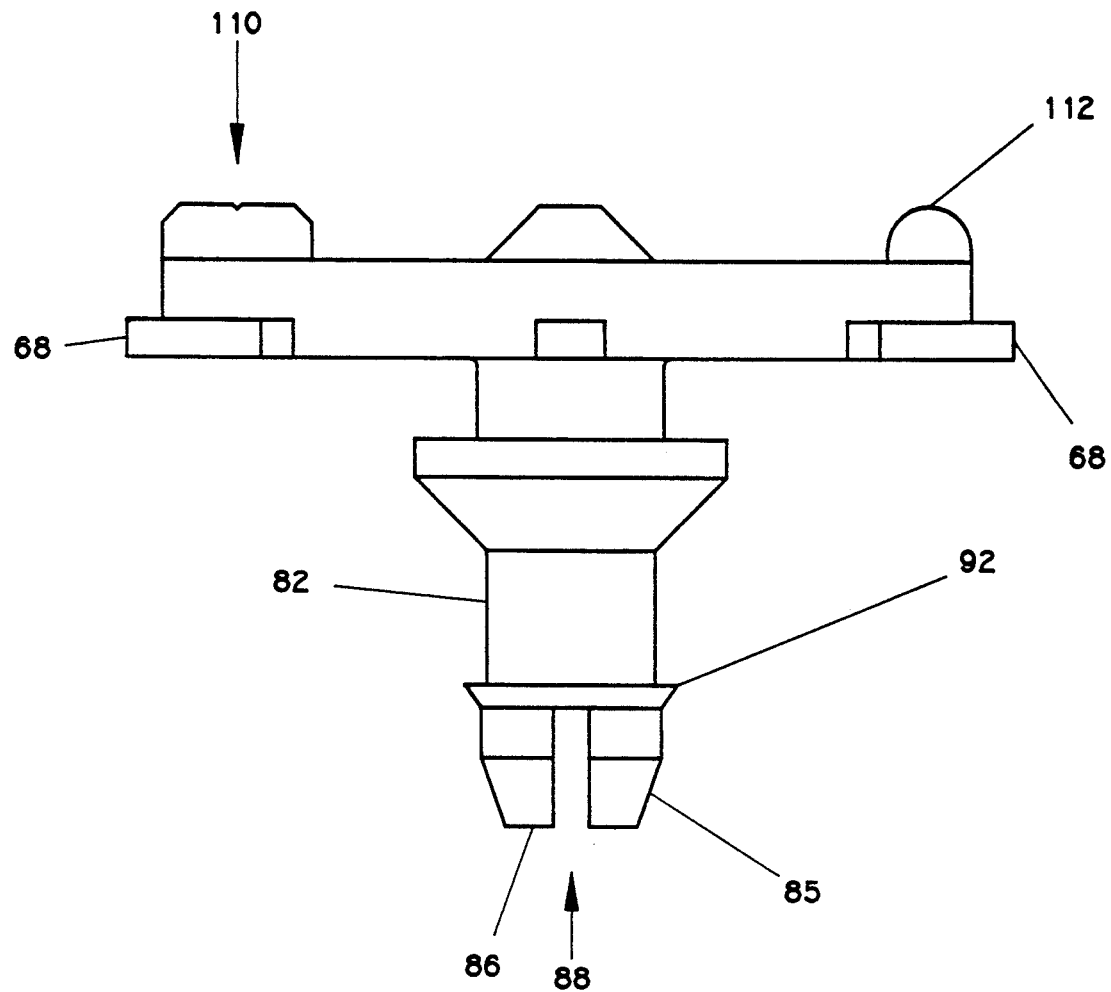
FIG. 5 shows the diaphragm insert with an alternative anti-hammer rib design.
Figure 6:
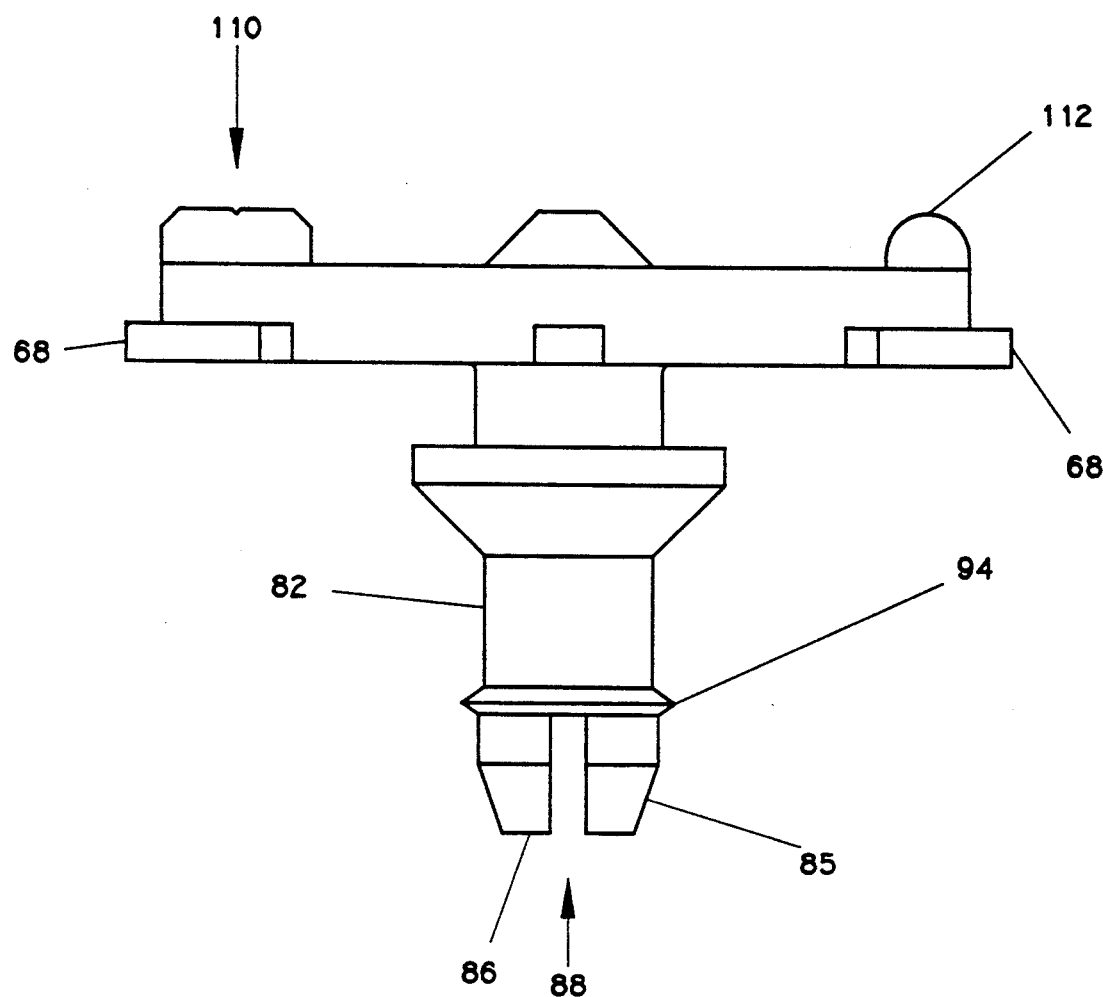
FIG. 6 shows the diaphragm insert with another alternative anti-hammer rib design.
Figure 7:
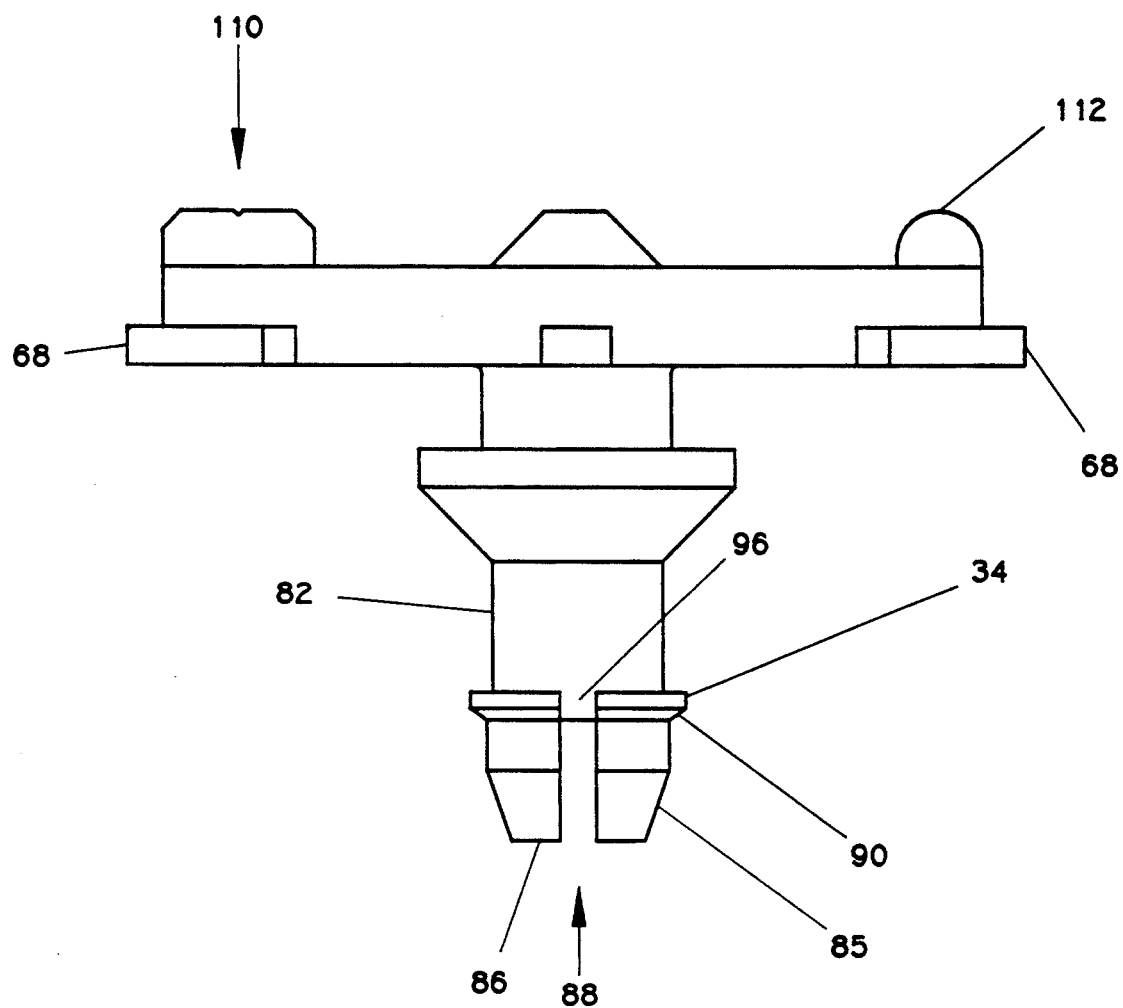
FIG. 7 shows the diaphragm insert with yet another alternative anti-hammer rib design.

As shown in FIGS. 5-7, the anti-hammer rib can be configured in a variety of forms including a single beveled rib 92 (FIG. 5) or double beveled rib 94 (FIG. 6) that creates a sharp edge. By shaping the anti-hammer rib 34 with an sharp edge, the anti-hammer rib would have a greater ability to scrape away accretions that could become deposited in the outlet 38 (FIG. 2). Another possible configuration of the anti-hammer rib 34 (FIG. 3) is a segmented anti-hammer rib 96 (FIG. 7).

Figure 8:
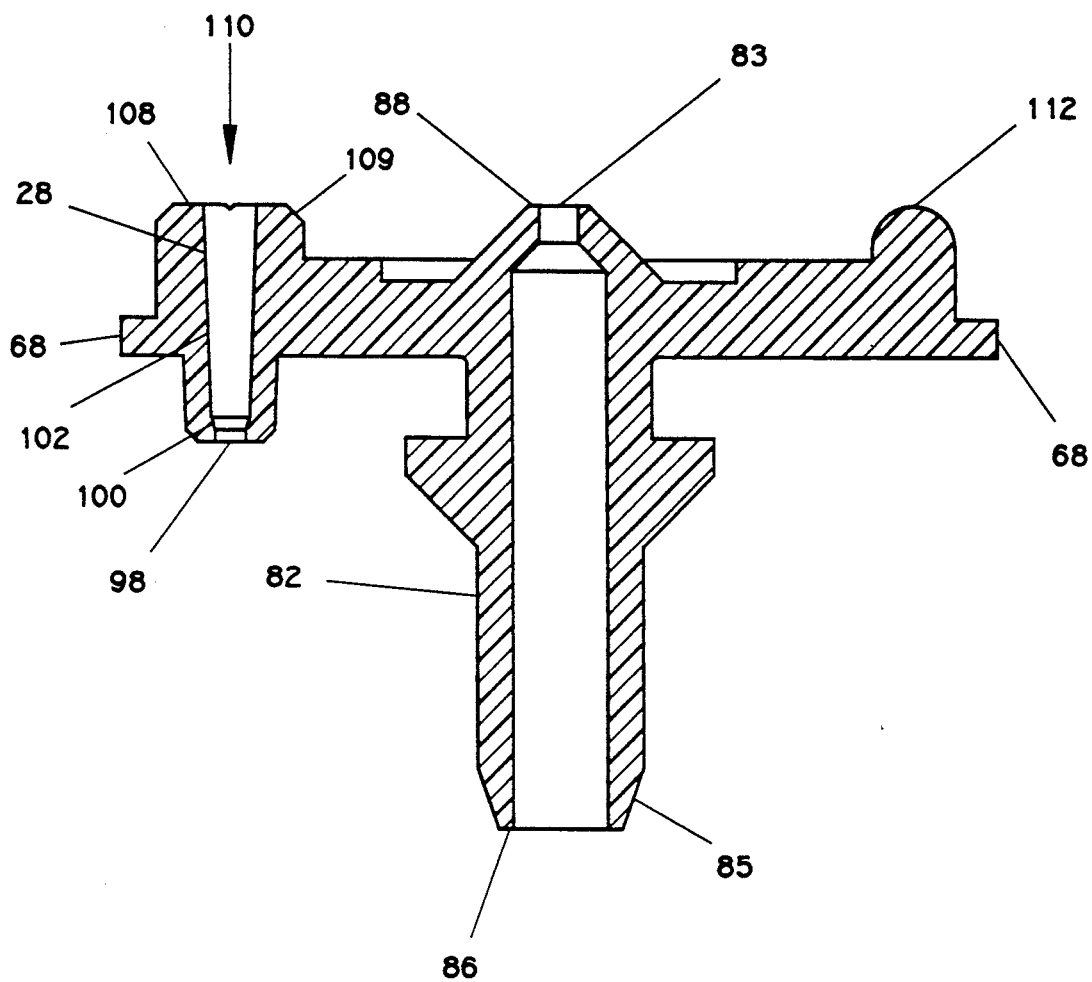
FIG. 8 shows the diaphragm insert with an extended bleed passage main chamber end.

The bleed passage 28 comprises a main chamber opening 98, a sharply widening bore 100, and a gradually widening bore 102. The function of the bleed passage 28 is to equalize pressure between the actuation chamber 58 and the main chamber 60. The main chamber opening 98 is about 0.029 inches (0.074 cm) in diameter which is smaller than the pilot valve passage 83 and at least 0.005 of an inch (0.0127 cm) thick to permit ease of manufacturing and to reduce the potential for the main chamber opening 98 to be eroded. The main chamber opening 98 can extend through the diaphragm bleed orifice 64 (FIG. 8). Since the main chamber opening 98 opens directly into the main chamber 60, contamination between the main chamber opening 98 and the diaphragm bleed orifice 64 is eliminated (FIG. 8). The sharply widening bore 100 of the bleed passage 28 begins immediately after the main chamber opening 98 and extends to the gradually widening bore 102 of the bleed passage 28. The sharply widening bore 100 functions to decrease the potential for contaminates to interfere or lodge in the main chamber opening 98. The gradually widening bore 102 functions to decrease the potential that contaminates will interfere or lodge in the gradually widening bore 102.

When the diaphragm insert 56 is assembled with the diaphragm 54, the main chamber opening 98 is aligned with a diaphragm bleed orifice 64. The diaphragm bleed orifice 64 is typically larger than the bleed passage 28 main chamber opening 98 to reduce the likelihood of contaminates being retained in the diaphragm bleed orifice 64.

The main chamber opening 98 is smaller than the actuation chamber opening 104, so if contamination enters the main chamber opening 98 the contamination will be exposed to a widening passage which will make it more difficult for the contamination to become lodged in the bleed passage 28. Also, the diameter of the main chamber opening 98 can be adjusted to vary the bleed rate.

The purpose of the sharply widening bore 100 is to rapidly expand the diameter of the bleed passage main chamber opening 98 so contamination partially lodged in the main chamber opening 98 can more easily pass through the bleed passage 28 into the actuation chamber 58. The sharply widening bore 100 provides contamination that enters bleed passage main chamber opening 98 with an increased movement space to make the contamination less stable and therefore more likely to pass through the bleed passage main chamber opening 98. The sharply widening bore 100 also increases the turbulence of water passing through the bleed passage 28 to further assist in moving contaminates that have entered the bleed passage main chamber opening 98 through the bleed passage 28 and into the actuation chamber 58. The sharply widening bore 100 does not begin immediately at the bleed passage main chamber opening 98 because such a structure could create a feathered main chamber opening 98 which would be susceptible to erosion and could increase production costs.

The flow reduction means 30 comprises a bleed valve 106 and a vacuum reduction opening 88. The flow reduction means 30 reduces water flow with accompanying contaminates into the bleed passage 28 when the main valve 24 is open thus reducing the potential for contaminates to deposit in the water valve 20. The bleed valve 106 has a seat 108 for mating with the guide tube 48 when the main valve 24 is open to substantially close the bleed valve 106. The bleed valve 106 is substantially closed when water flow is reduced through the bleed passage 28, yet enough water flow is permitted so when the pilot valve 26 initially closes enough water can flow through the bleed passage 28 to move the main valve 24 toward the outlet 38 to open the bleed valve 106.

Both the bleed valve seat 108 and the guide tube 48 are plastic, so when the bleed valve seat 108 mates with the guide tube 48 an imperfect seal is formed to permit a micro flow of water. The water valve 20 requires a micro flow of water so the instant the pilot valve 26 closes there will be enough water flow into the actuation chamber 58 to increase pressure enough to move the main valve 24 to open the bleed valve 106 to permit water flow through the bleed valve 106.

Figure 3:
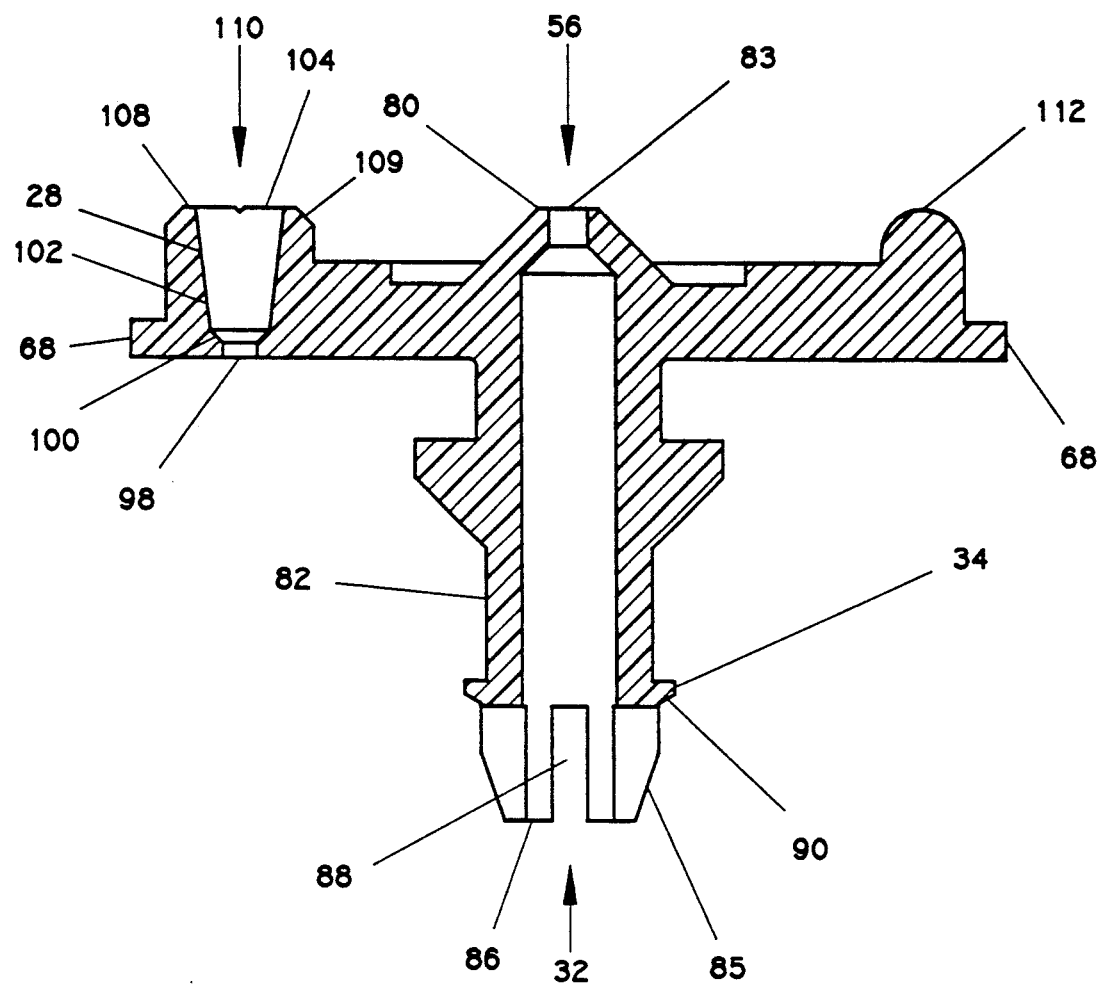
FIG. 3 shows a side view of a diaphragm insert.
Figure 4:
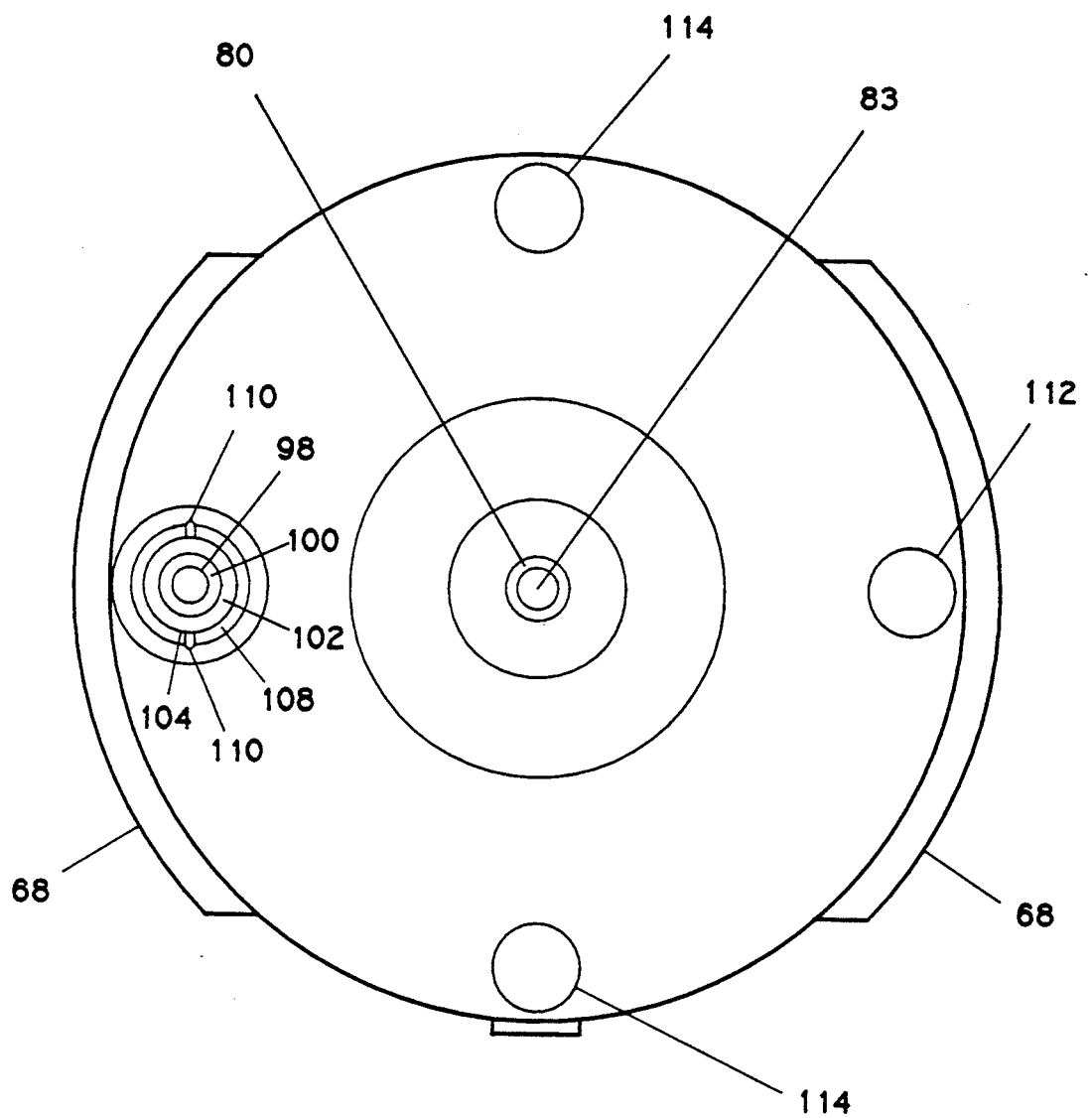
FIG. 4 shows a top view of the diaphragm insert.

Referring to FIGS. 3 and 4, the bleed valve seat 108 is chamfered 109 to reduce the seat 108 area which increases the seating pressure per area delivered by the main valve 24 and reduce the likelihood that contamination may interfere with seating. The purpose of increasing bleed valve 106 actuation chamber 58 seat pressure is to decrease the possibility that contamination will interfere with seating and to increase the closing force for the bleed valve 106 to substantially close.

Additionally, to further assure that the bleed valve 106 does not create a complete water tight seal when closing but only substantially closes, the bleed valve seat 108 has seating irregularities 110 which would permit a micro water flow even if the bleed valve 106 formed a complete seal. The seating irregularities 110 are "V" shaped relief notches cut into the bleed valve seat 108 for a depth of 0.00375 inches (0.00952 cm) each provide an opening area of 0.000014 square inches (0.00009 square cm) for ensuring an imperfect seal when the bleed valve seat 108 mates with the guide tube 48 to permit proper water valve 20 operation. Variations in seating irregularity 110 shapes are possible, and seating irregularities 110 could be placed in the guide tube 48 where the bleed valve seat 108 contacts the guide tube 40 with or in lieu of seating irregularities 110 placed on the bleed valve seat 108.

To ensure that the bleed valve seat 108 squarely mates with the guide tube 48, three seating projections 112 and 114 are provided on the diaphragm insert 56 to create a four-point stabilized contact for aligning the bleed valve seat 108 with the guide tube 48. The seating projection 112 opposite the bleed valve 106 is at the same height as the bleed valve seat 108, but the seating projection 114 adjacent to the bleed valve 106 are 0.005 inch (0.0127 cm) lower than the bleed valve seat 108 to act as levelers to maximize closing force of the bleed valve 106. The seating projections 112 and 114 have a radiused surface that contacts the guide tube 48 to reduce the surface area of contact and therefore the likelihood that contamination could interfere with the seating projections 112 and 114 contact with the guide tube 48.

The vacuum reduction means 32 comprises four vacuum reduction openings 88 in the pilot valve outlet extension 82. The vacuum reduction openings 88 could be configured in a variety of ways and achieve a similar result such as: by boring holes or horizontal slots. The four vacuum reduction openings 88 begin at the downstream opening 86 of the pilot valve outlet extension 82 and extend up to the anti-hammer rib 34. The purpose of the vacuum reduction means 32 is to decrease the pilot valve extension's 82 effective vacuum length when the main valve 24 is open, thus reducing vacuum drawn from the outlet 38 into the actuation chamber 58 through the pilot valve outlet extension 82. If less vacuum is drawn into the actuation chamber 58 when the main valve 24 is open, then the pressure differential between the main chamber 60 and the actuation chamber 58 is decreased and therefore water flow, with accompanying contaminates, through the bleed passage 28 into the actuation chamber 58 is reduced.

Also by using vacuum reduction openings 88 in the side of the pilot valve outlet extension 82, instead of merely shortening the pilot valve outlet extension 82, a guide tip 85 can still be provided on the downstream end 86 of the pilot valve outlet extension 82 while still achieving the advantage of reducing the effective vacuum length of the pilot valve outlet extension 82 to reduce the vacuum drawn into the actuation chamber 58.

Figure 9:
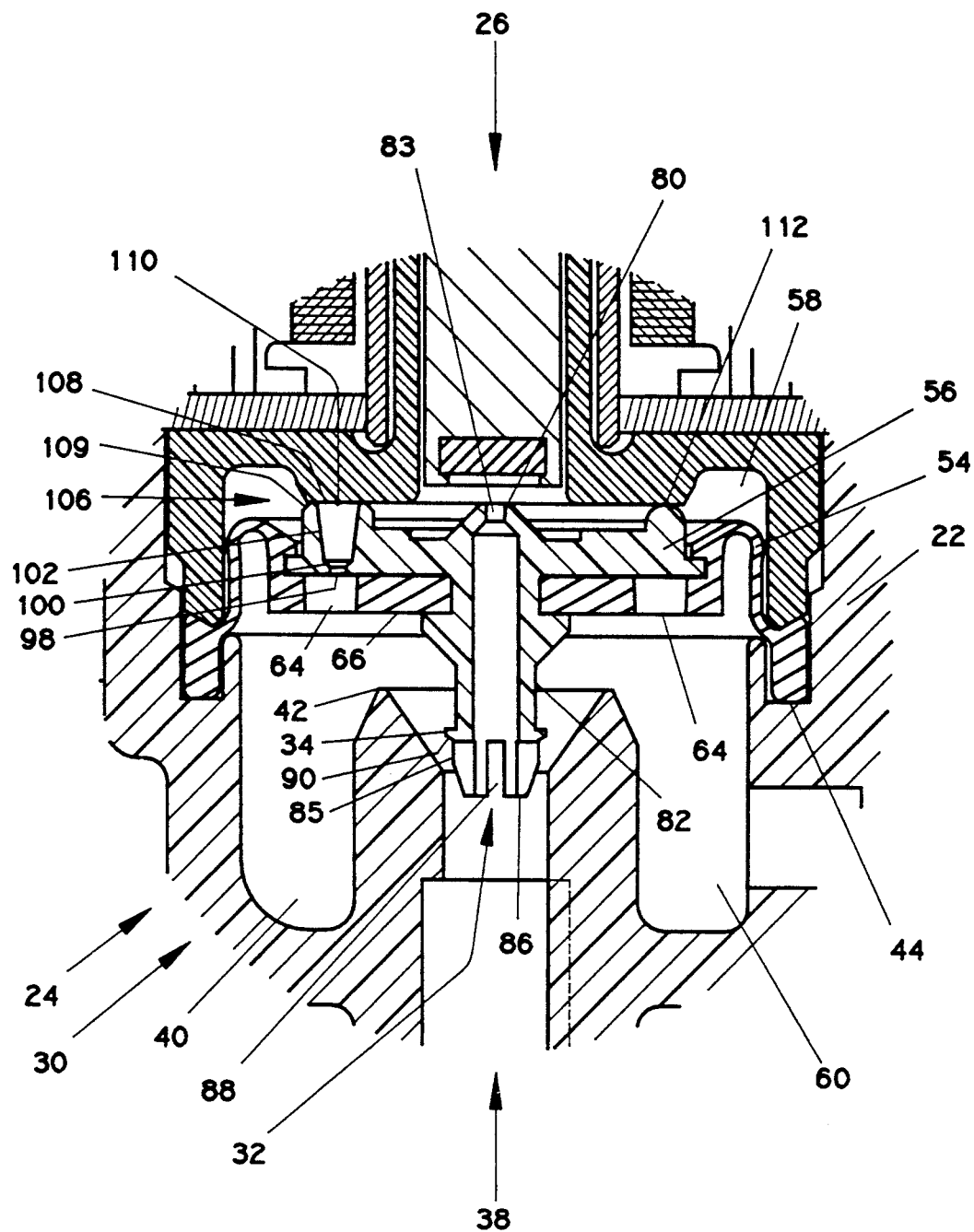
FIG. 9 shows the diaphragm insert in an open position with a pilot valve also in an open position.

Operation of the anti-clog water valve 20 (FIG. 2) is now described. FIG. 9 shows the main valve 24 actuated to the fully open position with the diaphragm valve seat 66 away from the valving surface 42 to permit water flow from the valve cavity 40 over the valving surface 42 into the outlet 38. The bleed passage 28 is closed substantially by mating the bleed valve 106 with the guide tube 48. Seating irregularities 110 are provided in the bleed valve seat 108 to ensure an imperfect seal is formed when the bleed valve 106 mates with the guide tube 48, so the instant a pilot valve 26 is closed some pressure equalization will occur to move the bleed valve 106 away from the guide tube 48 for operating main valve 24.

When the pilot valve 26 is open, the armature field windings 72 are energized, so the armature biasing spring 74 is compressed, and the armature 76 is pulled away from the pilot valve opening 83. With the pilot valve 26 opened, pressure in the actuation chamber 58 is lower than pressure in the main chamber 60 because a partial vacuum generated by water flow into the outlet 38 is transmitting into the actuation chamber 58 via the pilot valve outlet extension 82.

The effective vacuum length of the pilot valve outlet extension 82 is reduced by having at least one vacuum reduction opening 88 in the pilot valve outlet extension 82. Although the effective vacuum length of the pilot valve outlet extension 82 is decreased the same physical length is maintained so pilot valve outlet extension 82 can still function as intended for proper main valve 24 operation. By reducing the effective vacuum length of the pilot valve outlet extension 82, the pressure differential between the actuation chamber 58 and the main chamber 60 is decreased. The reduced pressure differential reduces water flow, with accompanying contaminates, into the bleed passage 28. The anti-hammer rib 34 turbulates water flowing over the valving surface 42 into the outlet 38. There is some water flow from the main chamber 60 into actuation chamber 58 through the bleed passage 28 because the bleed valve 106 is only substantially closed.

Figure 10:
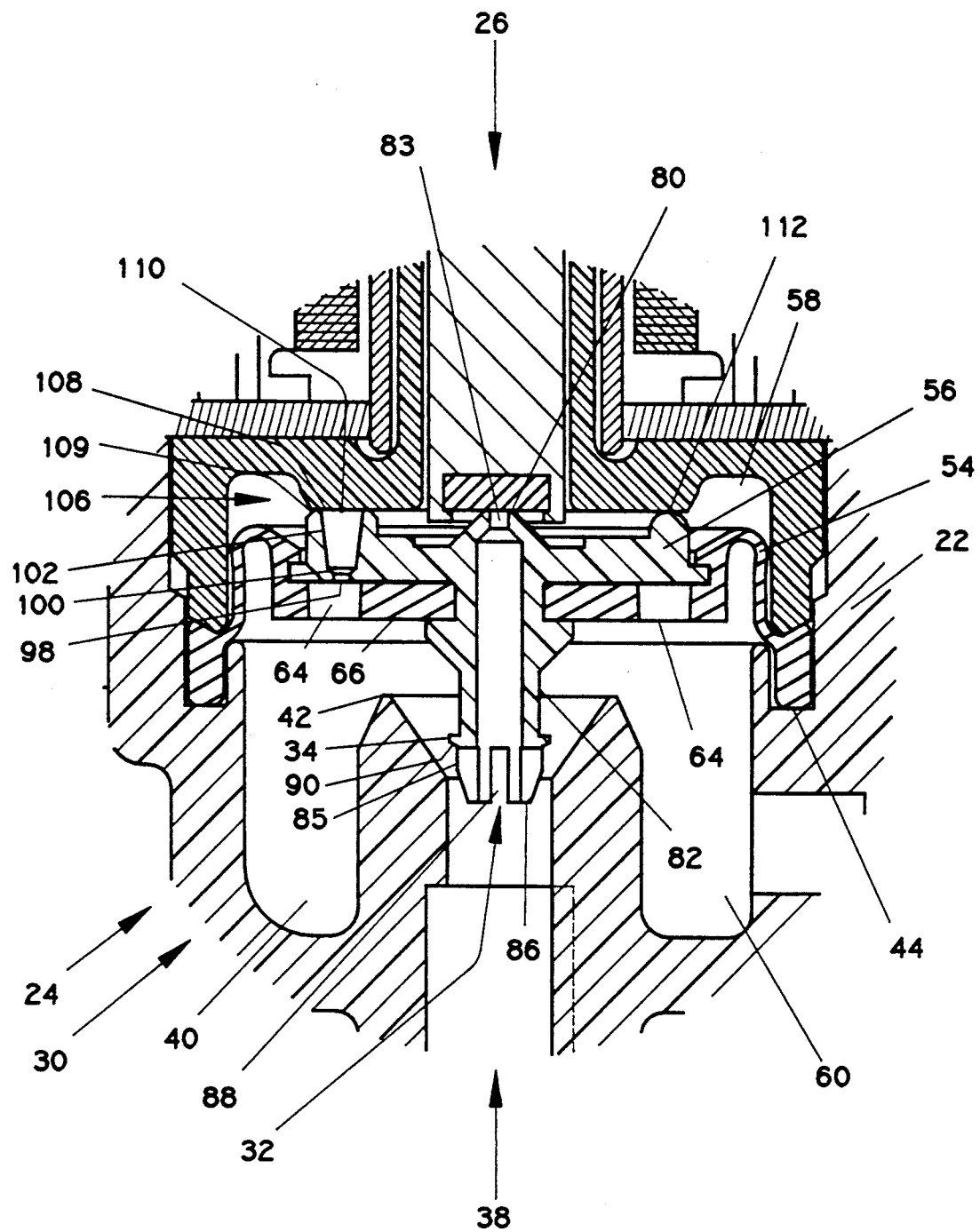
FIG. 10 shows the diaphragm insert the open position with the pilot valve closed.

FIG. 10 shows the main valve 24 fully open and the pilot valve 26 has just closed and the bleed valve 106 continues to be substantially closed. Since the pilot valve 26 has just closed, the main valve 24 will begin moving from an open position to a closed position. The pilot valve 26 closed when the armature field windings 72 were deenergized and the biasing spring 74 extended the armature 76 causing the pilot valve seat 78 to contact the pilot valve valving surface 80.

Since the pilot valve 26 is closed, water that passes through the substantially closed bleed valve 106 cannot exit the actuation chamber 58, and vacuum is no longer drawn through the pilot valve outlet extension 82 from the outlet 38. Pressure in the actuation chamber 58 quickly equals pressure in the main chamber 60 causing the main valve 24 to move toward the lower pressure outlet 38 to close the main valve 24. As the main valve 24 moves toward the valving surface 42, the bleed valve 106 is fully opened permitting free flow of water through the bleed passage 28.

The guide tip 85 on the pilot valve outlet extension 82 is positioned to guide the pilot valve outlet extension 82 into the outlet 38. If a guide tip 85 were not provided, the pilot valve outlet extension 82 could become misaligned or jammed in the outlet 38 when the pilot valve outlet extension 82 moves into the outlet 38. The anti-hammer rib 34 turbulates water flowing over the valving surface 42 into the outlet 38.

Figure 11:
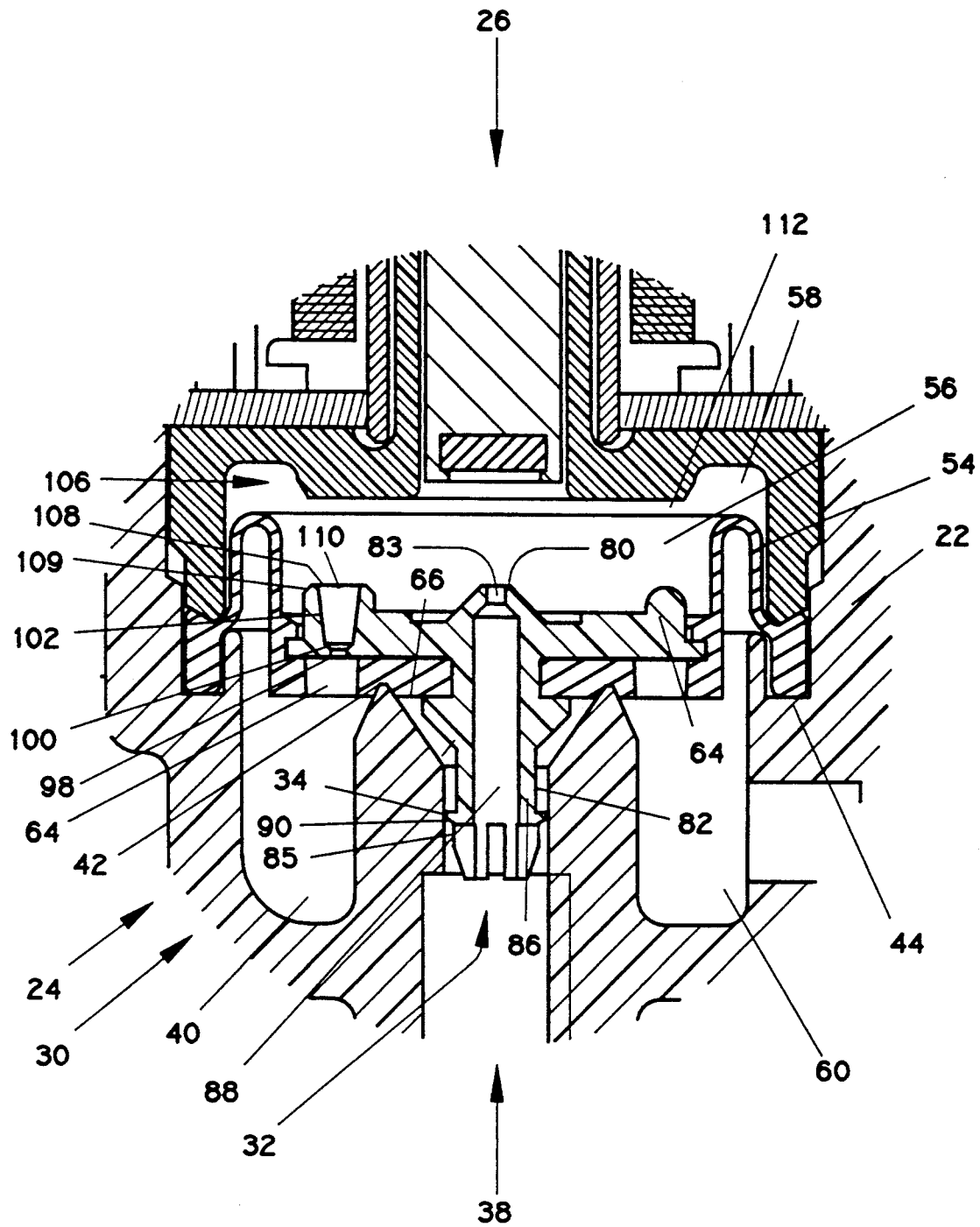
FIG. 11 shows the diaphragm insert in the closed position with the pilot valve opened.

FIG. 11 shows the main valve 24 in the closed position with the main valve seat 66 contacting the valving surface 42 to prevent water flow from the main chamber 60 into the outlet 38, and the pilot valve 26 is also closed. Since the water pressure causes the main chamber 60 to be at a higher pressure than the outlet 38, the pressure differential between the main chamber 60 and outlet 38 maintains the main valve 24 in the closed position. Although the bleed valve 106 is open, since the pilot valve 26 is closed little or no water flows through the bleed passage 28.

Armature field windings 72 continue to be deenergized so the biasing spring 74 continues to extend the armature 76 to close the pilot valve 26. The anti-hammer rib 34 is fitted into the outlet 38. As the main valve 24 moves from the open to the closed position, the anti-hammer rib 34 dampens main valve 24 closing by temporarily decreasing the pressure differential between the main chamber 60 and the outlet 38 when the anti-hammer rib 34 engages the outlet 38.

Figure 12:
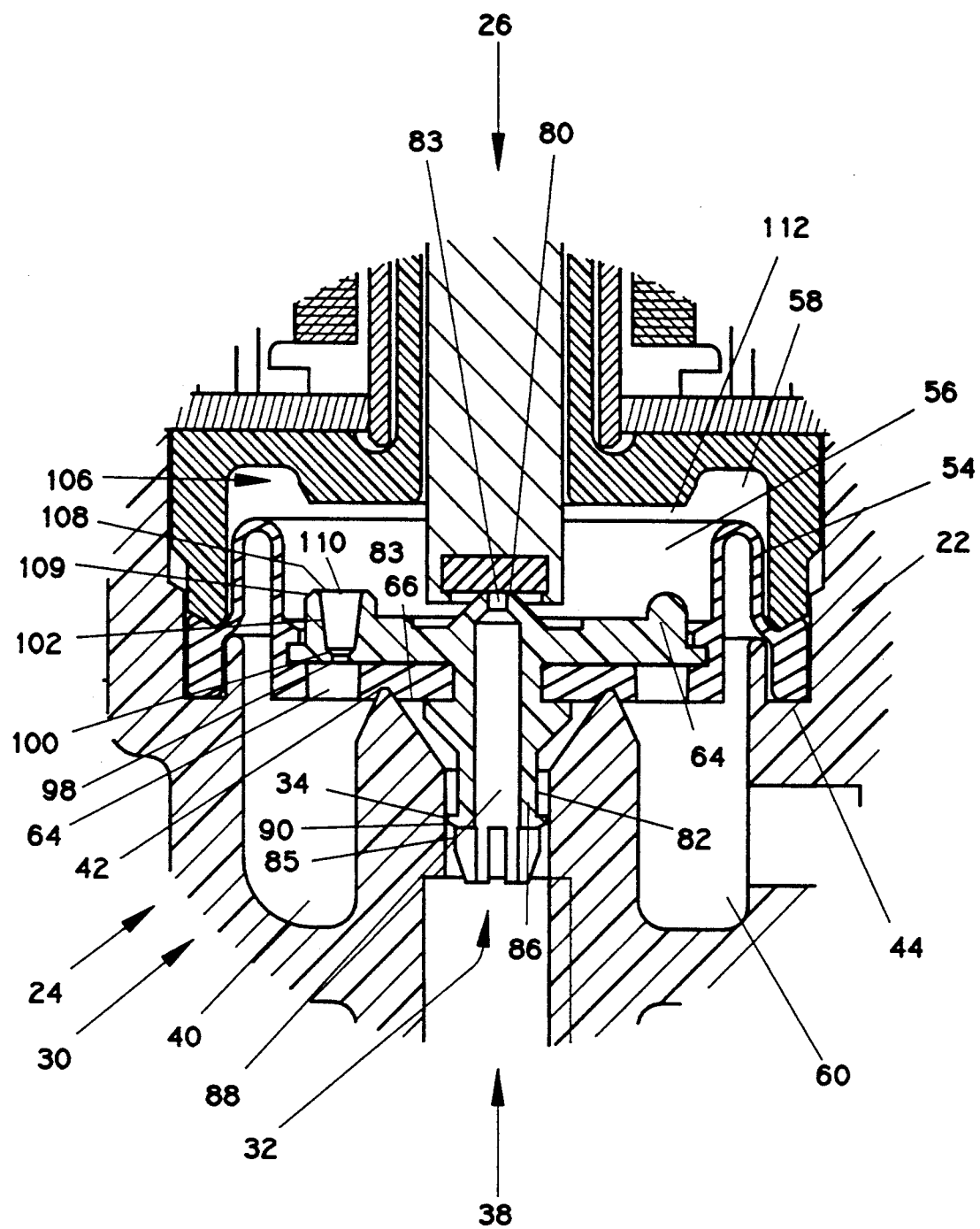
FIG. 12 shows the diaphragm insert in a closed position with the pilot valve also closed.

FIG. 12 continues to show the main valve 24 in the closed position but with the pilot valve 26 opened. Since the bleed valve 106 is open, water can flow freely through the bleed passage 28, into the actuation chamber 58, through the pilot valve 26 and into the outlet 38. Armature field windings 72 are energizing to retract the armature 76 and open the pilot valve 26. Once the pilot valve 26 is opened, water flows freely from the actuation chamber 58 through the pilot valve 26 and into the outlet 38. Replacement water flows into the actuation chamber 58 through the bleed passage 28 which has a smaller bleed passage main chamber opening 98 than the pilot valve passage 83. This difference in opening size causes pressure to be lower in the actuation chamber 58, and the lower pressure causes the main valve 24 to move to the open position.

Figure 1:
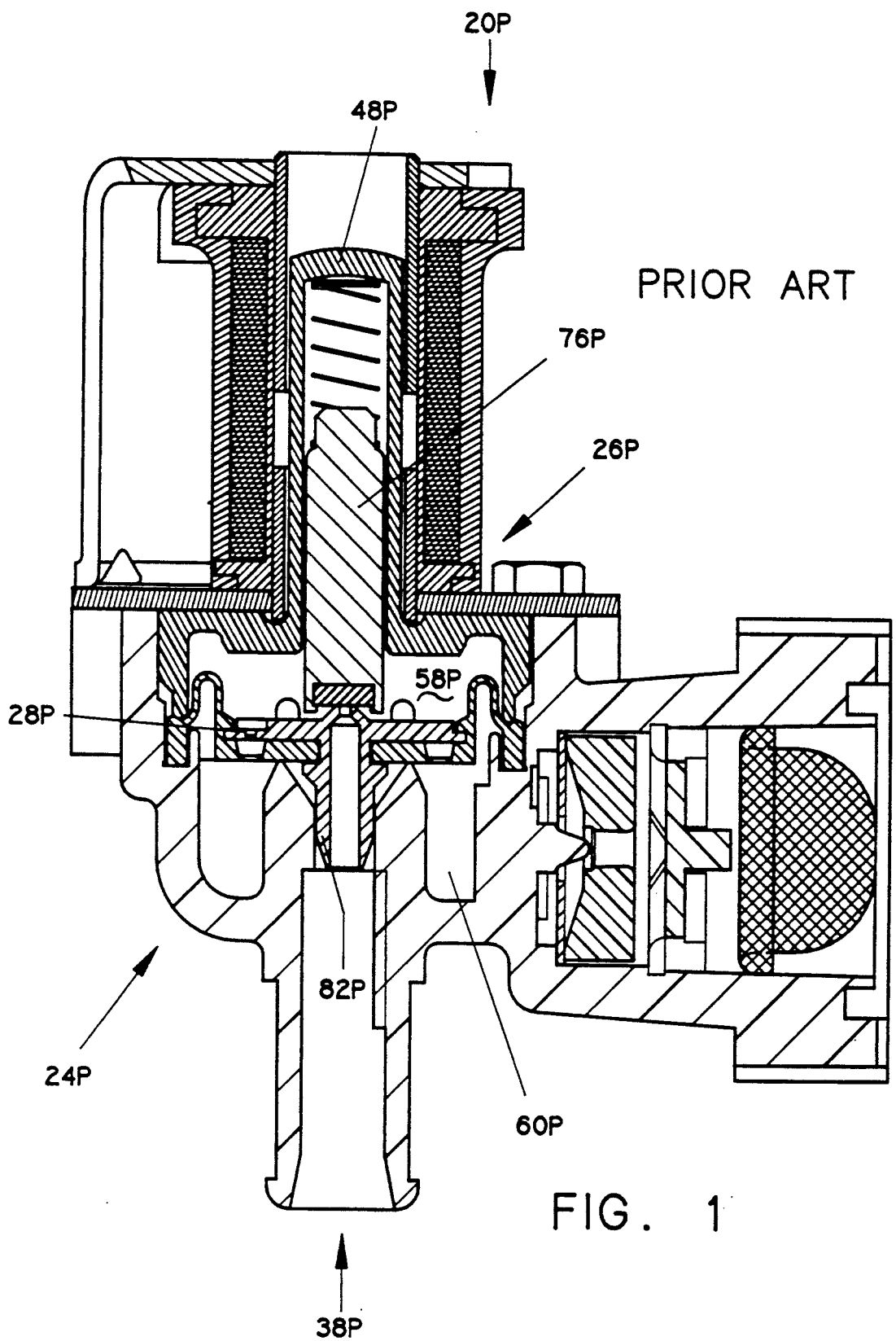
FIG. 1 shows a sectioned view of a prior art appliance inlet water valve.
Figure 13:
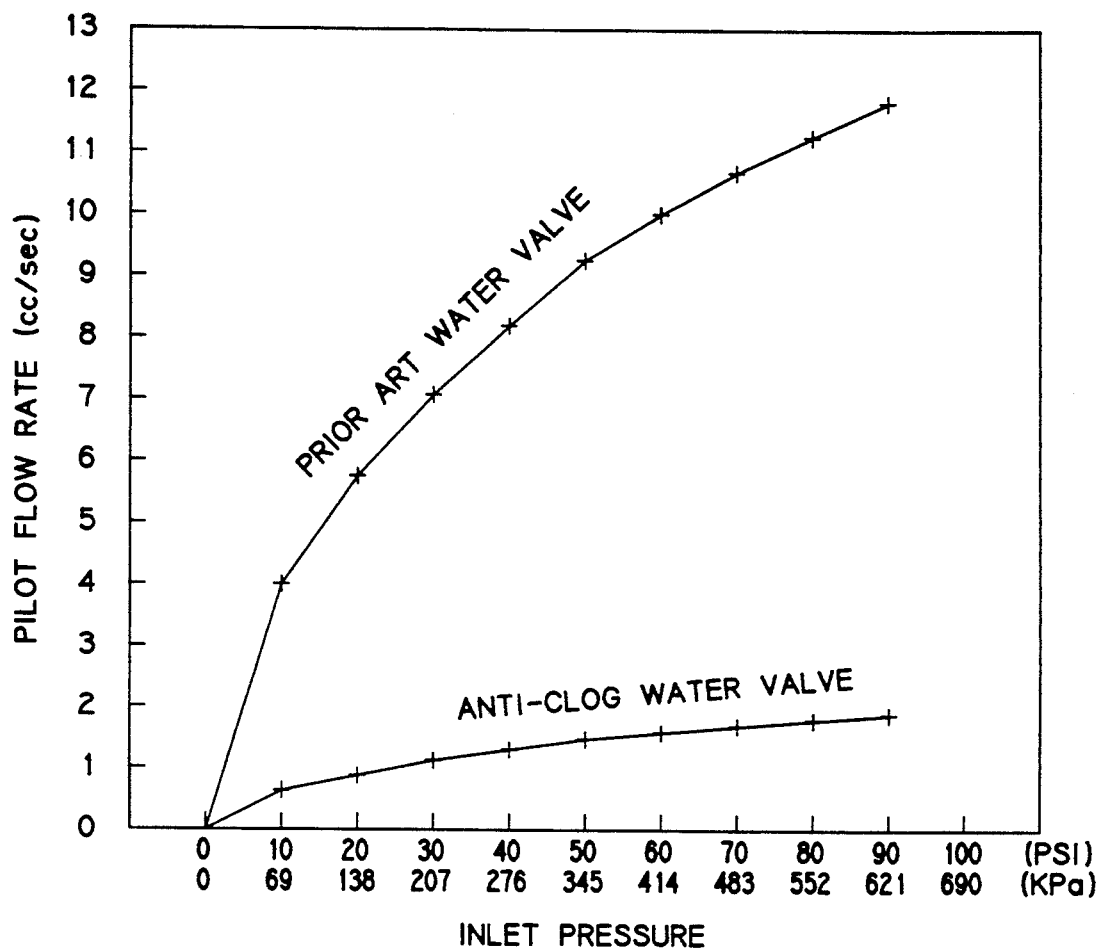
FIG. 13 shows a graph of pilot flow rates.

FIG. 13 shows a pilot valve flow rate comparison with the main valves fully open on the prior art water valve 20P shown in FIG. 1 and the anti-clog water valve 20 shown in FIG. 2 under similar test conditions. The prior art water valve 20P has a bleed passage 28P that is equally open when the main valve 24P is opened or closed. The anti-clog water valve 20 has a bleed valve 106 that substantially closes the bleed passage 28 and a vacuum reduction means 32 that significantly reduces pilot flow rate when the main valve 24 is fully open.

Figure 14:
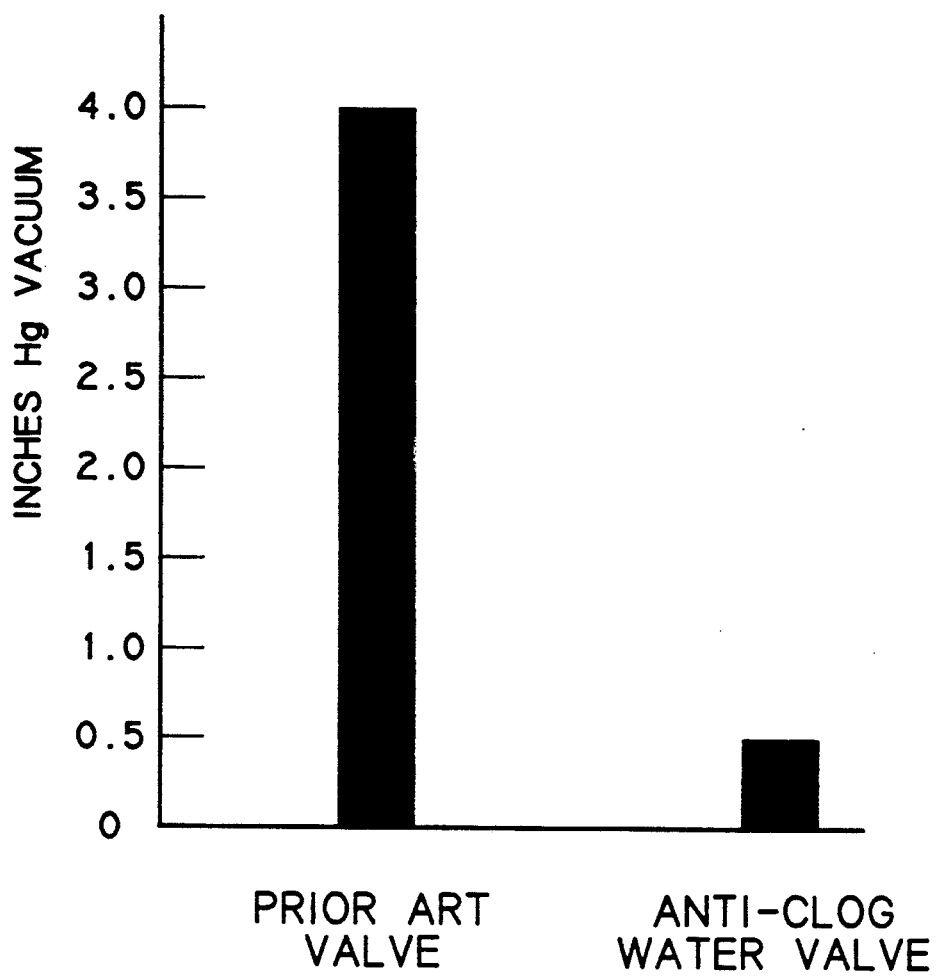
FIG. 14 shows a graph of vacuum in an actuation chamber with the main valve open; and, FIG. 15 shows a graph of average noise levels.

FIG. 14 shows a vacuum comparison with the main valve fully open of vacuum drawn into the prior art water valve 20P (FIG. 1) actuation chamber 58P with vacuum drawn into the anti-clog water valve 20 (FIG.

2) actuation chamber 58 under similar test conditions. Referring to FIG. 2, the combination of the bleed valve 106 and the vacuum reduction opening 88 in the anti-clog water valve 20 significantly reduces the vacuum drawn into the actuation chamber 58.

Figure 15:
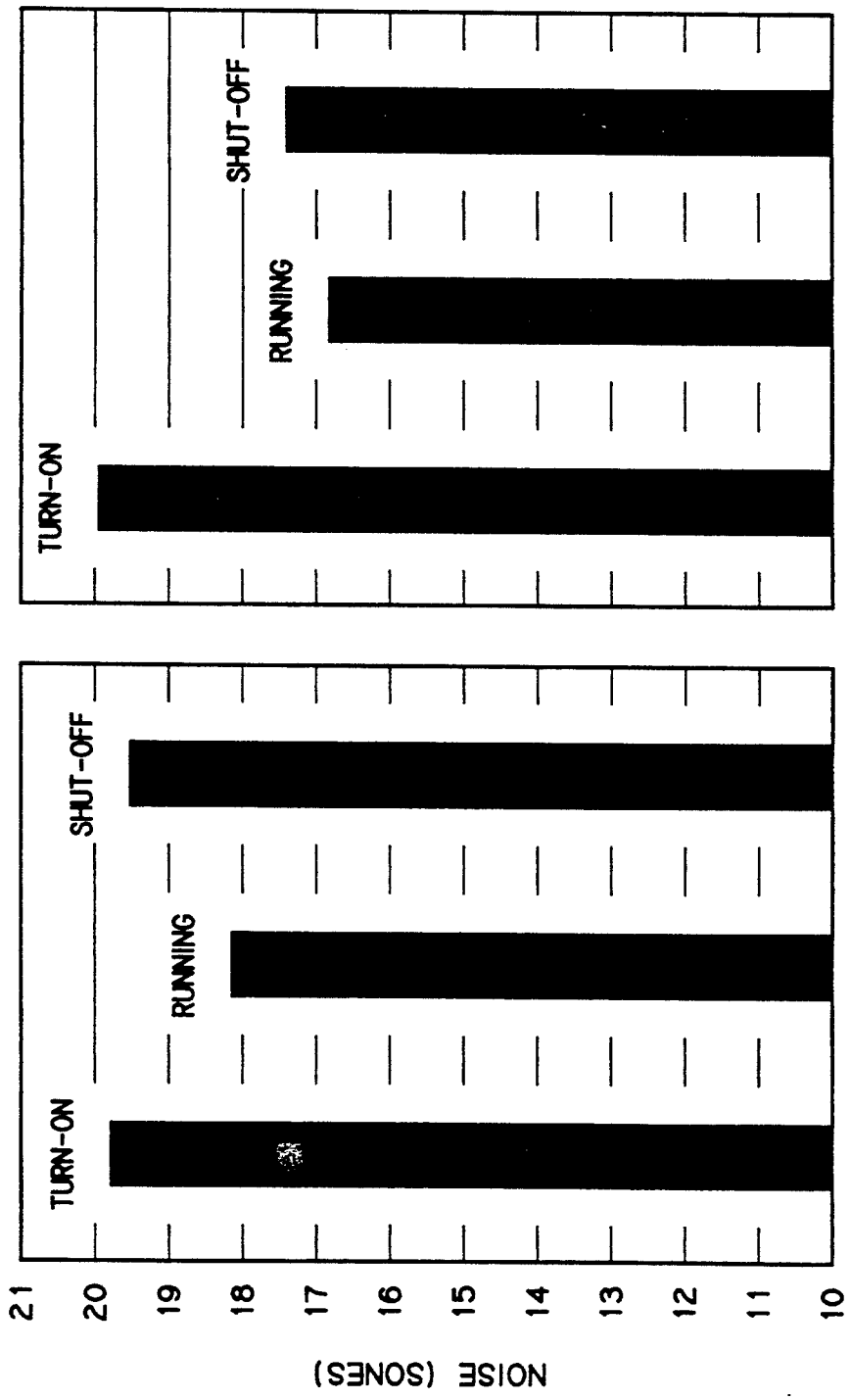

FIG. 15 shows average noise level comparison graphs of the prior art water valve 20P shown in FIG. 1 and the anti-clog water valve 20 shown in FIG. 2 under similar test conditions. These graphs illustrate that the anti-clog water valve 20 is quieter in operation, while running, and during shut-off. Referring to FIG. 2, the anti-clog water valve's 20 quieter operation can be attributed to reduced water flow through the bleed passage 28 and water turbulence caused by the anti-hammer rib 34 and vacuum reduction opening 88. The anti-clog water valve's 20 quieter shut-off can be attributed to the anti-hammer rib 34 which slows main valve 24 closing.

The previously described versions of the present invention have many advantages, including: reduced water flow through the bleed passage 28 when the main valve 24 is fully open and therefore reduced likelihood that waterborne contamination will enter the bleed passage 28 to potentially become lodged or pass through the bleed passage 28 and enter the actuation chamber 58; with a decreased likelihood of contamination entering the actuation chamber 58, the armature 76 is exposed to less contamination and therefore less likely to encounter obstructions during movement increasing pilot valve 26 reliability; and, the pilot valve 26 is exposed to less contamination and therefore less likely to have contamination lodge in the pilot valve passage 83 to interfere with pilot valve 26 operation.

Although the present invention has been described in considerable detail with reference to certain preferred versions thereof, other versions are possible. For example the bleed valve 106 could be modified in size and shape, so long as the bleed valve 106 substantially closes when the main valve 24 is fully open. Also the portion of the guide tube 48 where the bleed valve 106 mates could be modified in shape or size such as extending farther into the actuation chamber 58 thereby decreasing the size of the bleed valve 106, or the relief notches could be cut in the guide tube 48 rather than the bleed valve 106 and still perform the same function. Therefore, the spirit and scope of the appended claims should not be limited to the description of the preferred versions contained herein.

What is claimed is:

1. An anti-clog water valve, comprising:
   (a) a valve body defining an inlet, an outlet, and a valving cavity disposed between and communicating with the inlet and the outlet, and a valving surface between the inlet and the outlet;
   (b) a main valve dividing the valving cavity into an actuation chamber and a main chamber with the main valve moveable to a position away from the valving surface for permitting flow from the inlet through the valving cavity to the outlet, and moveable to a position contacting the valving surface for preventing flow from the inlet through the valving cavity;
   (c) a pilot valve having a solenoid armature slideably carried in a guide tube moveable to a position away from a pilot valve seat for permitting water flow from the actuation chamber to the outlet and moveable to a position contacting the pilot valve seat for preventing water flow from the actuation chamber to the outlet, and an outlet extension slideably engaging the outlet for providing a water flow channel from the actuation chamber through the pilot valve into the outlet;
   (d) a bleed passage formed in the main valve for providing limited communication between the main chamber and the activation chamber thus permitting pressure equalization through water flow from the main chamber into the actuation chamber, and thus assisting in actuating the main valve; and,
   (e) a bleed valve formed on an actuation chamber end of the bleed passage having a seat for mating with the guide tube when the main valve is open to substantially close the bleed valve for reducing water flow with accompanying contaminates into the actuation chamber.

2. An anti-clog water valve as recited in claim 1 wherein to substantially close the bleed valve is to close the bleed valve enough to reduce water flow through the bleed passage, yet permit enough water flow through the bleed passage so when the pilot valve initially closes enough water can flow through the bleed passage to move the main valve toward the outlet to open the bleed valve.

3. An anti-clog water valve as recited in claim 2 wherein the bleed valve seat is plastic and the guide tube is plastic so that when the bleed valve seat mates with the guide tube there is an imperfect seal for permitting proper anti-clog valve operation.

4. An anti-clog water valve as recited in claim 3 wherein the bleed valve seat is chambered to decrease seating surface to decrease the force required to close the bleed valve.

5. An anti-clog water valve as recited in claim 2 wherein there are seating irregularities where the bleed valve seat mates with a guide tube for ensuring an imperfect seal permitting proper anti-clog valve operation.

6. An anti-clog water valve as recited in claim 5 wherein the seating irregularities comprise a relief notch for ensuring an imperfect seal when the bleed valve seat mates with the guide tube permitting proper anti-clog operation.

7. An anti-clog water valve as recited in claim 1 wherein the main valve comprises at least one seating projection for aligning a bleed valve seat against a guide tube.

8. An anti-clog water valve, comprising:
   (a) a valve body defining an inlet, an outlet, and a valving cavity disposed between and communicating with the inlet and the outlet, and a valving surface between the inlet and the outlet;
   (b) a main valve dividing the valving cavity into an actuation chamber and a main chamber with the main valve moveable to a position away from the valving surface for permitting flow from the inlet through the valving cavity to the outlet, and moveable to a position contacting the valving surface for preventing flow from the inlet through the valving cavity;
   (c) a pilot valve having a solenoid armature slideably carried in a guide tube moveable to a position away from a pilot valve seat to permitting water flow from the actuation chamber to the outlet and moveable to a position contacting the pilot valve seat for preventing water flow from the actuation chamber to the outlet, and an outlet extension slideably engaging the outlet for providing a water flow channel from the actuation chamber through the pilot valve into the outlet;

(d) a bleed passage formed in the main valve for providing limited communication between the main chamber and the activation chamber thus permitting pressure equalization through water flow from the main chamber into the actuation chamber, and thus assisting in actuating the main valve; and, (e) at least one vacuum reduction opening in a downstream end of the pilot valve outlet extension continuously communicating with a pilot valve passage in the pilot valve outlet extension for reducing the pressure differential between the main chamber and the actuation chamber when the main valve opens thus reducing water flow throught the bleed passage and slowing main valve closing.

9. An anti-clog valve as recited in claim 8 wherein the vacuum reduction opening extends from a downstream end of the pilot valve extension up to an anti-hammer annular rib.

10. An anti-clog water valve, comprising:

(a) a valve body defining an inlet, an outlet, and a valving cavity disposed between and communicating with the inlet and the outlet, and a valving surface between the inlet and the outlet;

(b) a main valve dividing the valving cavity into an actuation chamber and a main chamber with the main valve moveable to a position away from the valving surface for permitting flow from the inlet through the valving cavity to the outlet, and moveable to a position contacting the valving surface for preventing flow from the inlet through the valving cavity;

(c) a pilot valve having a solenoid armature slideably carried in a guide tube moveable to a position away from a pilot valve seat for permitting water flow from the actuation chamber to the outlet and moveable to a position contacting the pilot valve seat for preventing water flow from the actuation chamber to the outlet, and an outlet extension slideably engaging the outlet for providing a water flow channel from the actuation chamber through the pilot valve into the outlet;

(d) a bleed passage formed in the main valve for providing limited communication between the main chamber and the activation chamber thus permitting water flow from the main chamber into the actuation chamber, and thus assisting in actuating the main valve; and, (e) at least one vacuum reduction opening in a downstream end of the pilot valve outlet extension continuously communicating with a pilot valve passage in the pilot valve outlet extension for reducing the pressure differential between the main chamber and the actuation chamber when the main valve opens thus reducing water flow throught the bleed passage and slowing main valve closing, (f) an anti-hammer rib on the pilot valve outlet extension to create a back pressure when engaging the outlet during main valve closing thus slowing main valve closing for reducing internal valve noise and pipe hammer wherein the anti-hammer rib is separated from the downstream end of the pilot valve extension by a guide tip.

11. An anti-clog valve as recited in claim 10 wherein the anti-hammer rib is adjacent to at least one vacuum reduction opening.

12. An anti-clog valve as recited in claim 10 wherein the anti-hammer rib is no wider than about 0.025 of an inch (0.0635 cm) to reduce the potential for contamination to be deposited between the anti-hammer rib and the outlet.

13. An anti-clog valve as recited in claim 10 wherein the anti-hammer rib has a downstream edge that is chamfered for ease of movement in the outlet and to increase structural strength.

14. An anti-clog valve as recited in claim 10 wherein the anti-hammer rib is a continuous annular ridge.

15. An anti-clog valve as recited in claim 10 wherein the anti-hammer rib is an interrupted annular ridge.

16. An anti-clog valve as recited in claim 10 wherein the guide tip has a downstream end that is tapered to guide the pilot valve outlet extension into the outlet when the main valve means moves from an opened position to a closed position.

17. A method of reducing the flow of contaminates into a bleed passage in a pilot operated appliance water valve, comprising the steps of:

(a) providing a valve body defining an inlet, an outlet, and a valving cavity disposed between and communicating with the inlet and the outlet, and a valving surface between the inlet and the outlet;

(b) providing a main valve dividing the valving cavity into an actuation chamber and a main chamber with the main valve moveable to a position away from the valving surface for permitting flow from the inlet through the valving cavity to the outlet, and moveable to a position contacting the valving surface for preventing flow from the inlet through the valving cavity;

(c) providing a pilot valve having a solenoid armature slideably carried in a guide tube moveable to a position away from a pilot valve seat for permitting water flow from the actuation chamber to the outlet and moveable to a position contacting the pilot valve seat for preventing water flow from the actuation chamber to the outlet, and an outlet extension slideably engaging the outlet for providing a water flow channel from the actuation chamber through the pilot valve into the outlet;

(d) providing a bleed passage formed in the main valve for providing limited communication between the main chamber and the activation chamber thus permitting pressure equalization through water flow from the main chamber into the actuation chamber, and thus assisting in actuating the main valve; and, (e) providing a bleed valve formed on an actuation chamber end of the bleed passage having a seat for mating with the guide tube when the main valve is open to substantially close the bleed valve for reducing water flow with accompanying contaminates into the actuation chamber.

18. The method of claim 17, further comprising the step of: providing relief notches in the bleed valve to ensure an imperfect seal is formed when the bleed valve mates with the guide tube, so the instant a pilot valve is closed some pressure equalization will occur to move the bleed valve away from the guide tube thus operating the pilot operated appliance water valve.

19. A method in an appliance inlet water valve of reducing contaminates from interfering with the movement of a pilot valve outlet extension in an outlet, comprising the steps of:

(a) providing a valve body defining an inlet, an outlet, and a valving cavity disposed between and communicating with the inlet and the outlet, and a valving surface between the inlet and the outlet;

(b) providing a main valve dividing the valving cavity into an actuation chamber and a main chamber with the main valve moveable to a position away from the valving surface for permitting flow from the inlet through the valving cavity to the outlet, and moveable to a position contacting the valving surface for preventing flow from the inlet through the valving cavity;

(c) providing a pilot valve having a solenoid armature slideably carried in a guide tube moveable to a position away from a pilot valve seat for permitting water flow from the actuation chamber to the outlet and moveable to a position contacting the pilot valve seat for preventing water flow from the actuation chamber to the outlet, and an outlet extension slideably engaging the outlet for providing a water flow channel from the actuation chamber through the pilot valve into the outlet;

(d) providing a bleed passage formed in the main valve for providing limited communication between the main chamber and the activation chamber thus permitting water flow from the main chamber into the actuation chamber, and thus assisting in actuating the main valve;

(e) providing at least one vacuum reduction opening in a downstream end of the pilot valve outlet extension continuously communicating with a pilot valve passage in the pilot valve outlet extension for reducing the pressure differential between the main chamber and the actuation chamber when the main valve opens thus reducing water flow throught the bleed passage and slowing main valve closing; and, (f) providing an anti-hammer rib on the pilot valve outlet extension to create a back pressure when engaging the outlet during main valve closing thus slowing main valve closing for reducing internal valve noise and pipe hammer wherein the anti-hammer rib is separated from the downstream end of the pilot valve extension by a guide tip.

20. The method as recited in claim 19 wherein the raised annular rib creates a back pressure when engaging the outlet during main valve closing thus slowing main valve closing for reducing internal valve noise and pipe hammer.

21. The method as recited in claim 20 wherein the raised annular rib is no wider than about 0.025 of an inch (0.0635 centimeters) to reduce the potential for contaminates to interfere with pilot valve outlet extension movement in the outlet.

* * * * *

UNITED STATES PATENT AND TRADEMARK OFFICE
CERTIFICATE OF CORRECTION

PATENT NO. : 5,269,333

DATED : December 14, 1993

INVENTOR(S) : James W. Richmond

It is certified that error appears in the above-indentified patent and that said Letters Patent is hereby corrected as shown below:

Title page, should appear as shown on the attached page. The drawing sheets, consisting of Figs. 2 and 12 should be deleted to be replaced with the drawing sheets, consisting of Figs. 2 and 12 as shown on the attached page.

United States Patent [19]

Richmond

[11] Patent Number: 5,269,333

[45] Date of Patent: Dec. 14, 1993

[54] ANTI-CLOG WATER VALVE

[75] Inventor: James W. Richmond, Carmel, Ind.

[73] Assignee: Emerson Electric Co., St. Louis, Mo.

[21] Appl. No.: 52,008

[22] Filed: Apr. 22, 1993

[51] Int. Cl.⁵ .............. F16K 31/04; F16K 31/40; F16K 31/385

[52] U.S. Cl. .............................. 137/1; 251/30.03; 251/30.05; 251/38; 251/45; 251/120

[58] Field of Search ............... 138/45, 46, 251/30.02, 251/30.03, 30.04, 30.05, 38, 45, 46, 118, 120; 137/1, 2

[56] References Cited

U.S. PATENT DOCUMENTS

| | | | |
|---|---|---|---|
| Re. 29,863 | 12/1978 | Kozel et al. | 137/242 |
| 3,593,956 | 7/1971 | McCarty, Jr. | 251/30.03 |
| 3,593,957 | 7/1971 | Polter et al. | 251/30 |
| 3,672,627 | 6/1972 | McCarty, Jr. et al. | 251/30 |
| 3,872,878 | 3/1975 | Kozel et al. | 137/242 |
| 4,174,824 | 11/1979 | Kolze | 251/30.03 |
| 4,178,573 | 12/1979 | Swanson | 251/30.03 |
| 4,179,096 | 12/1979 | Fromfield | 251/38 |
| 4,387,878 | 6/1983 | Zukausky | 251/30.03 |
| 4,453,563 | 6/1984 | Walters | 137/414 |
| 4,500,067 | 2/1985 | Zukausky | 251/38 |
| 4,844,112 | 6/1989 | Pick et al. | 137/15 |
| 4,860,990 | 8/1989 | Fukuzawa et al. | 251/30.03 |
| 5,082,240 | 1/1992 | Richmond | 251/120 |
| 5,090,441 | 2/1992 | Richmond | 137/242 |
| 5,125,621 | 6/1992 | Parsons et al. | 251/30.03 |
| 5,145,145 | 9/1992 | Pick et al. | 251/30.03 |
| 5,154,394 | 10/1993 | DuHack | 251/120 |

Primary Examiner—George L. Walton
Attorney, Agent, or Firm—Robert F. Meyer; Eric R. Waldkoetter

[57] ABSTRACT

A household appliance, solenoid controlled, pilot actuated inlet water valve has a diaphragm insert with a bleed valve that substantially closes when a main valve is open to reduce water and contaminate flow through the bleed passage. The pilot valve outlet extension has openings to reduce vacuum drawn from the outlet into an actuation chamber thereby further reducing water flow through the bleed passage. The bleed passage is internally and externally configured to reduce contamination impairment. An anti-hammer rib or lip is placed on the pilot valve outlet extension upstream of a guide tip which provides less close-fitting surface that may be impaired by contaminates while still dampening valve closing to reduce valve noise and pipe hammer.

21 Claims, 15 Drawing Sheets

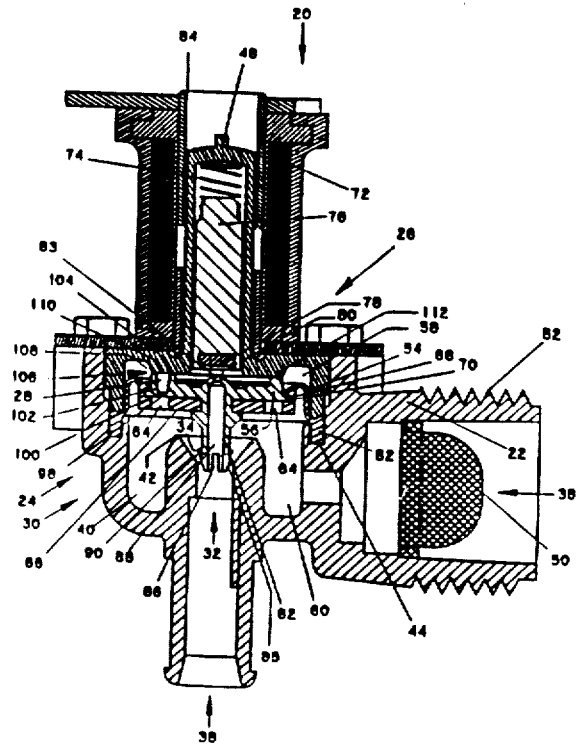

UNITED STATES PATENT AND TRADEMARK OFFICE
CERTIFICATE OF CORRECTION

PATENT NO. : 5,269,333
DATED : December 14, 1993
INVENTOR(S) : James W. Richmond It is certified that error appears in the above-indentified patent and that said Letters Patent is hereby corrected as shown below:

Column 1, line 14 after "water" insert --valve--;

Column 1, line 39 after "drain" insert --which may--;

Column 1, line 53 before "when" insert --open--;

Column 1, line 66 change "opens" to --closes--;

Column 10, line 18 change "FIG. 11" to -- FIG. 12--;

Column 10, line 38 change "FIG. 12" to --FIG. 11--;

Column 12, Claim 4, line 2 change "chambered" to --chamfered--.

Signed and Sealed this

Seventh Day of June, 1994

Attest:

BRUCE LEHMAN

Attesting Officer          Commissioner of Patents and Trademarks

UNITED STATES PATENT AND TRADEMARK OFFICE
CERTIFICATE OF CORRECTION

Page 4 of 5

PATENT NO. : 5,269,333
DATED : December 14, 1993
INVENTOR(S) : James W. Richmond It is certified that error appears in the above-indentified patent and that said Letters Patent is hereby corrected as shown below:

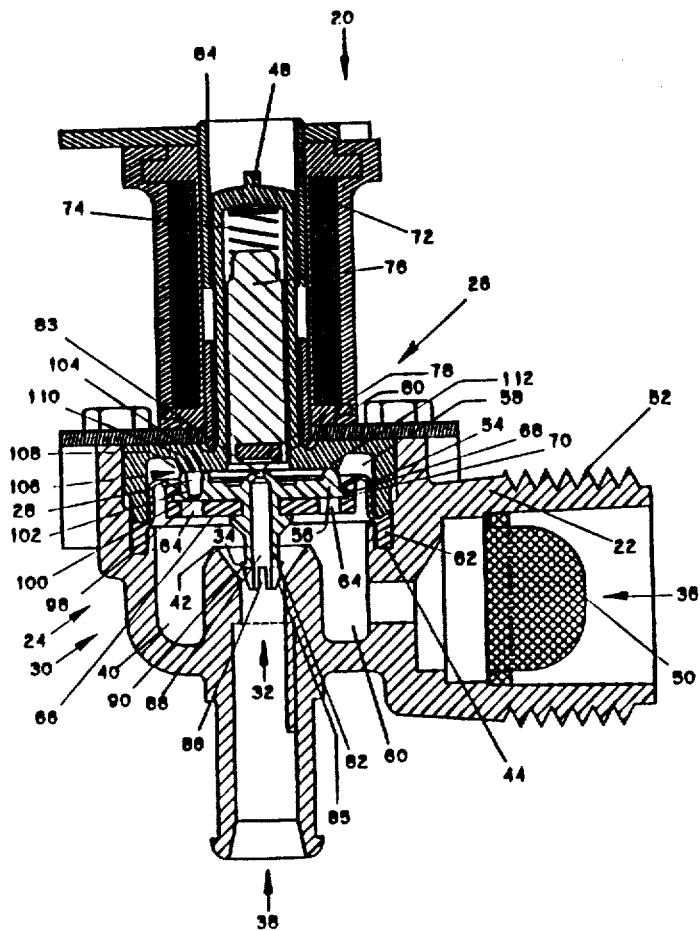

FIG. 2

UNITED STATES PATENT AND TRADEMARK OFFICE
CERTIFICATE OF CORRECTION

Page 5 of 5

PATENT NO. : 5,269,333
DATED : December 14, 1993
INVENTOR(S) : James W. Richmond It is certified that error appears in the above-indentified patent and that said Letters Patent is hereby corrected as shown below:

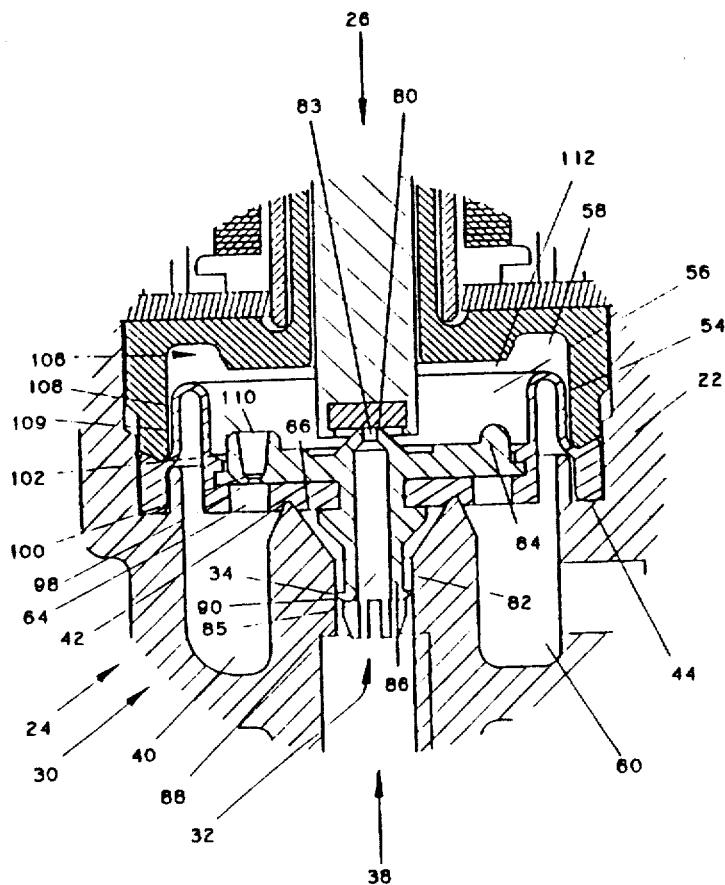

FIG. 12